United States Patent
Gou et al.

(10) Patent No.: US 12,107,685 B2
(45) Date of Patent: Oct. 1, 2024

(54) CODEBOOK DETERMINATION METHOD, CODEBOOK DETERMINATION APPARATUS, TERMINAL, BASE STATION, AND STORAGE MEDIUM

(71) Applicant: ZTE Corporation, Guangdong (CN)

(72) Inventors: Wei Gou, Guangdong (CN); Peng Hao, Guangdong (CN); Xing Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 675 days.

(21) Appl. No.: 17/277,281

(22) PCT Filed: Sep. 17, 2019

(86) PCT No.: PCT/CN2019/106179
§ 371 (c)(1),
(2) Date: Mar. 17, 2021

(87) PCT Pub. No.: WO2020/057499
PCT Pub. Date: Mar. 26, 2020

(65) Prior Publication Data
US 2022/0029752 A1    Jan. 27, 2022

(30) Foreign Application Priority Data
Sep. 18, 2018  (CN) .......................... 201811085745.7

(51) Int. Cl.
*H04L 1/1829*  (2023.01)

(52) U.S. Cl.
CPC .......... *H04L 1/1861* (2013.01); *H04L 1/1848* (2013.01); *H04L 1/1864* (2013.01)

(58) Field of Classification Search
CPC .... H04L 1/1848; H04L 1/1861; H04L 1/1864
See application file for complete search history.

(56) References Cited

U.S. PATENT DOCUMENTS

| 2018/0019843 | A1 | 1/2018 | Papasakellariou |
| 2018/0241510 | A1 | 8/2018 | Shen |
| 2020/0120606 | A1 * | 4/2020 | Beale .................... H04W 76/28 |

FOREIGN PATENT DOCUMENTS

| CN | 106549734 A | 3/2017 | |
| CN | 108289015 A | 7/2018 | |
| CN | 108292974 A | 7/2018 | |
| EP | 3627936 B1 * | 7/2022 | .......... H04L 1/1642 |
| WO | WO 2018/111401 A1 | 6/2018 | |

OTHER PUBLICATIONS

PCT/CN2019/106179, Dec. 13, 2019, International Search Report.
(Continued)

*Primary Examiner* — Brian P Cox

(57) ABSTRACT

Provided are a codebook determination method, a codebook determination apparatus, a terminal, a base station and a storage medium. The codebook determination method includes that a UE determines, based on a timing of being awakened, a timing at which physical downlink shared channel (PDSCH) data is receivable by the UE; and the UE forms a corresponding Hybrid Automatic Repeat reQuest-acknowledgement (HARQ-ACK) codebook based on the timing at which the PDSCH data is receivable.

17 Claims, 9 Drawing Sheets

---

A base station configures at least two interval k1 value sets or at least two interval k0 value sets for a UE — S91

The base station instructs the UE to select one k1 or k0 value set from the k1 value sets or the k0 value sets or determines that the UE selects one k1 or k0 value set from the k1 value sets or the k0 value sets according to a rule agreed between the UE and the base station — S92

The base station determines that the UE forms an HARQ-ACK codebook based on the selected k1 or k0 value set — S93

(56) References Cited

OTHER PUBLICATIONS

International Search Report mailed Dec. 13, 2019 in connection with International Application No. PCT/CN2019/106179.
Korean Request for the Submission of an Opinion dated Jan. 17, 2023, in connection with Korean Application No. 10-2021-7011424.
[No Author Listed], Timing aspects for downlink HARQ in HR. Nokia, Alcatel-Lucent Shanghai Bell. 3GPP TSG RAN WG1#89. RI-1708528. May 2017. 5 pages.
Extended European Search Report dated May 24, 2022, in connection with European Application No. EP19862615.2.
Indian Examination Report dated May 25, 2022, in connection with Indian Application No. 202127017633.
Chinese Office Action dated Jul. 20, 2022, in connection with Chinese Application No. 201811085745.7.

[No Author Listed], Corrections on HARQ Feedback. Samsung. 3GPP TSG RAN WG1 #AH 1801. Jan. 2018. 9 pages.
[No Author Listed], Harq enhancements in NR unlicensed. Huawei, HiSilicon. 3GPP TSG RAN WG1 Meeting #93. May 2018. 5 pages.
[No Author Listed], On Compact DCI Design for URLLC. Media Tek Inc. 3GPP TSG RAN WG1 Meeting #92bis. Apr. 2018. 8 pages.
[No Author Listed], On NR HARQ timing and management. CATT. 3GPP TSG RAN WG1 Meeting #92. Feb. 2018. 3 pages.
[No Author Listed], On wake-up signal for eFeMTC. Huawei, HiSilicon. 3GPP TSG RAN WG1 Meeting #93. May 2018. 5 pages.
[No Author Listed], Remaining issues on HARQ. Huawei, HiSilicon. 3GPP TSG RAN WG1 Meeting 91. Nov. 2017.14 pages.
[No Author Listed], Remaining issues on NR CA. Huawei HiSilicon. 3GPP TSG RAN WG1 Meeting #92bis. Apr. 2018. 6 pages.
[No Author Listed], WF on TDD configuration for NR UE REFSENS. NTT Docomo, Inc. 3GPP TSG-RAN WG4 Meeting #87. May 2018. 8 pages.

* cited by examiner

```
┌─────────────────────────────────────────────────────────────┐
│ The base station confirms the following operations: A UE    │
│ receives a wake-up signal and confirms that the UE is       │
│ awakened by the wake-up signal, and the UE acquires the     │
│ position and/or the number of CCs from the wake-up          │
│ signal; or the base station confirms that the UE activates  │      S81
│ CCs through a MAC CE and uses the activated CCs as          │─────
│ working CCs; or the base station confirms that the UE       │
│ acquires, from DCI, the position and/or the number of       │
│ working CCs required by the UE after the UE is awakened;    │
│ or the base station confirms that the UE uses default CCs   │
│ as working CCs according to a rule agreed between the UE    │
│ and a base station                                          │
└─────────────────────────────────────────────────────────────┘
                              │
                              ▼
┌─────────────────────────────────────────────────────────────┐
│ The base station confirms that the UE determines, in each   │      S82
│ of the working CCs based on the timing of being awakened,   │─────
│ the timing at which PDSCH data is receivable by the UE      │
└─────────────────────────────────────────────────────────────┘
```

FIG. 8

```
┌─────────────────────────────────────────────────────────────┐
│ A base station configures at least two interval k1 value    │      S91
│ sets or at least two interval k0 value sets for a UE        │─────
└─────────────────────────────────────────────────────────────┘
                              │
                              ▼
┌─────────────────────────────────────────────────────────────┐
│ The base station instructs the UE to select one k1 or k0    │
│ value set from the k1 value sets or the k0 value sets or    │      S92
│ determines that the UE selects one k1 or k0 value set from  │─────
│ the k1 value sets or the k0 value sets according to a rule  │
│ agreed between the UE and the base station                  │
└─────────────────────────────────────────────────────────────┘
                              │
                              ▼
┌─────────────────────────────────────────────────────────────┐
│ The base station determines that the UE forms an HARQ-ACK   │      S93
│ codebook based on the selected k1 or k0 value set           │─────
└─────────────────────────────────────────────────────────────┘
```

FIG. 9

CODEBOOK DETERMINATION METHOD, CODEBOOK DETERMINATION APPARATUS, TERMINAL, BASE STATION, AND STORAGE MEDIUM

CROSS-REFERENCES TO RELATED APPLICATIONS

This Application is a national stage filing under 35 U.S.C. § 371 of International Patent Application Serial No. PCT/CN2019/106179, filed Sep. 17, 2019, entitled "CODEBOOK DETERMINATION METHOD, CODEBOOK DETERMINATION APPARATUS, TERMINAL, BASE STATION, AND STORAGE MEDIUM". Foreign priority benefits are claimed under 35 U.S.C. § 119(a)-(d) or 35 U.S.C. § 365(b) of Chinese application number 201811085745.7, filed Sep. 18, 2018. The entire contents of these applications are incorporated herein by reference in their entirety.

TECHNICAL FIELD

The present disclosure relates to, but is not limited to, the field of communication technology.

BACKGROUND

In a codebook determination method, a user equipment (UE) always calculates, based on an interval K1 value set, a timing at which a physical downlink shared channel (PDSCH) is transmittable. Regardless of whether a base station transmits PDSCH data at this timing and regardless of whether the UE receives PDSCH data at this timing, the UE always forms a Hybrid Automatic Repeat reQuest-Acknowledgement (HARQ-ACK) codebook for every timing. In order for the UE to save energy, a new channel or signal, called a WUS or WUP, is introduced. The basic function of the WUS or WUP is to awaken the UE that is sleeping. Generally, after the UE is awakened by the WUS/WUP, the UE operates in a corresponding carrier or bandwidth. That is, before being awakened by the WUS/WUP, the UE is in the sleep state to save energy. Only after the UE is awakened, can the UE start to operate and can the data transmitted by a base station is received by the UE.

However, in the preceding codebook method, since the UE forms a corresponding codebook for every timing at which the PDSCH is transmittable, a relatively large codebook is formed, and the codebook overheads are increased.

SUMMARY

Embodiments of the present disclosure provide a codebook determination method, a codebook determination apparatus, a terminal, a base station and a storage medium.

In a first aspect, an embodiment of the present disclosure provides a codebook determination method. The method includes that a UE determines, based on a timing of being awakened, a timing at which physical downlink shared channel (PDSCH) data is receivable by the UE; and the UE forms a corresponding Hybrid Automatic Repeat reQuest-Acknowledgement (HARQ-ACK) codebook based on the timing at which the PDSCH data is receivable.

In a second aspect, an embodiment of the present disclosure provides a codebook determination method. The method includes that a UE receives signaling, where at least two interval k1 value sets or at least two interval k0 value sets are configured in the signaling; the UE receives an indication of a base station and selects one k1 or k0 value set from the k1 value sets or the k0 value sets according to the indication, or the UE selects one k1 or k0 value set from the k1 value sets or the k0 value sets according to a rule agreed between the UE and the base station; and the UE forms an HARQ-ACK codebook based on the selected k1 or k0 value set. k1 satisfies that in response to the end of a PDSCH received by the UE being in slot n, an HARQ-ACK corresponding to the PDSCH is transmitted in slot n+k1. k0 satisfies that in response to the end of downlink control information (DCI) which is used for scheduling PDSCH and received by the UE being in slot n, the PDSCH corresponding to the DCI is transmitted in slot n+k0.

In a third aspect, an embodiment of the present disclosure provides a codebook determination method. The method includes that a base station confirms that a UE determines, based on a timing of being awakened, a timing at which PDSCH data is receivable by the UE; and the base station confirms that the UE forms a corresponding HARQ-ACK codebook based on the timing at which the PDSCH data is receivable.

In a fourth aspect, an embodiment of the present disclosure provides a codebook determination method. The method includes that a base station configures at least two interval k1 value sets or at least two interval k0 value sets for a UE; the base station instructs the UE to select one k1 or k0 value set from the k1 value sets or the k0 value sets or determines that the UE selects one k1 or k0 value set from the k1 value sets or the k0 value sets according to a rule agreed between the UE and the base station; and the base station determines that the UE forms an HARQ-ACK codebook based on the selected k1 or k0 value set. k1 satisfies that in response to the end of a PDSCH received by the UE being in slot n, an HARQ-ACK corresponding to the PDSCH is transmitted in slot n+k1. k0 satisfies that in response to the end of DCI which is used for scheduling PDSCH and received by the UE being in slot n, the PDSCH corresponding to the DCI is transmitted in slot n+k0.

In a fifth aspect, an embodiment of the present disclosure provides a codebook determination apparatus. The apparatus includes a first confirmation module and a second confirmation module.

The first confirmation module is configured to confirm that a UE determines, based on a timing of being awakened, a timing at which PDSCH data is receivable by the UE. The second confirmation module is configured to confirm that the UE forms a corresponding HARQ-ACK codebook based on the timing at which the PDSCH data is receivable.

In a sixth aspect, an embodiment of the present disclosure provides a codebook determination apparatus. The apparatus includes a configuration module, an indication module and a determination module. The configuration module is configured to configure at least two interval k1 value sets or at least two interval k0 value sets for a UE. The indication module is configured to instruct the UE to select one k1 or k0 value set from the k1 value sets or the k0 value sets or is configured to determine that the UE selects one k1 or k0 value set from the k1 value sets or the k0 value sets according to a rule agreed with the UE. The determination module is configured to determine that the UE forms an HARQ-ACK codebook based on the selected k1 or k0 value set. k1 satisfies that in response to the end of a PDSCH received by the UE being in slot n, an HARQ-ACK corresponding to the PDSCH is transmitted in slot n+k1. k0 satisfies that in response to the end of DCI which is used for scheduling PDSCH and received by the UE being in slot n, the PDSCH corresponding to the DCI is transmitted in slot n+k0.

In a seventh aspect, an embodiment of the present disclosure provides a terminal. The terminal includes a memory, a processor, and a computer program stored in the memory and executable by the processor. When executing the computer program, the processor performs the following method steps: determining, based on a timing of being awakened, a timing at which PDSCH data is receivable by the UE; and forming a corresponding HARQ-ACK codebook based on the timing at which the PDSCH data is receivable.

Alternatively, when executing the computer program, the processor performs the following method steps: receiving signaling, where at least two interval k1 value sets or at least two interval k0 value sets are configured in the signaling; receiving an indication of a base station and selecting one k1 or k0 value set from the k1 value sets or the k0 value sets according to the indication, or selecting one k1 or k0 value set from the k1 value sets or the k0 value sets according to a rule agreed between the UE and the base station; and forming an HARQ-ACK codebook based on the selected k1 or k0 value set.

In an eighth aspect, an embodiment of the present disclosure provides a base station. The base station includes a memory, a processor, and a computer program stored in the memory and executable by the processor. When executing the computer program, the processor performs the following method steps: confirming that a UE determines, based on a timing of being awakened, a timing at which PDSCH data is receivable by the UE; and confirming that the UE forms a corresponding HARQ-ACK codebook based on the timing at which the PDSCH data is receivable.

Alternatively, when executing the computer program, the processor performs the following method steps: configuring at least two interval k1 value sets or at least two interval k0 value sets for a UE; instructing the UE to select one k1 or k0 value set from the k1 value sets or the k0 value sets, or determining that the UE selects one k1 or k0 value set from the k1 value sets or the k0 value sets according to a rule agreed between the UE and the base station; and determining that the UE forms an HARQ-ACK codebook based on the selected k1 or k0 value set.

In a ninth aspect, an embodiment of the present disclosure provides a storage medium. The storage medium stores a computer program. When executing the computer program, a processor performs steps of any preceding codebook determination method.

BRIEF DESCRIPTION OF DRAWINGS

Various other advantages and benefits will be apparent to those having ordinary skill in the art after the detailed description of the embodiments described below is read. The drawings are merely for the purpose of illustrating the preferred embodiments and are not to be construed as limiting the present disclosure. Moreover, like reference numerals refer to like parts throughout the drawings.

FIG. 8 is a flowchart of a codebook determination method according to a tenth embodiment of the present disclosure.

FIG. 9 is a flowchart of a codebook determination method according to an eleventh embodiment of the present disclosure.

DETAILED DESCRIPTION

Example embodiments of the present disclosure are described in more detail hereinafter with reference to the drawings. The drawings illustrate example embodiments of the present disclosure, but it is to be understood that the present disclosure may be implemented in various manners and is not to be limited to the embodiments set forth herein. On the contrary, these embodiments are provided for a thorough understanding of the present disclosure and to fully convey the scope of the present disclosure to those skilled in the art.

Figure 1:
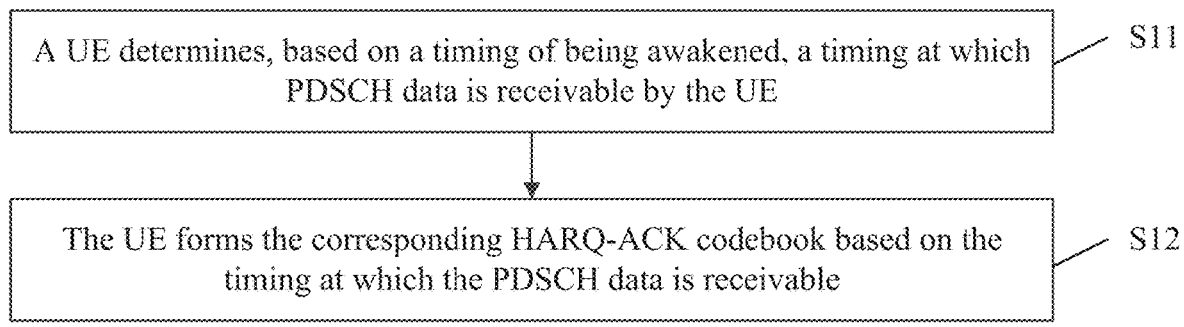
FIG. 1 is a flowchart of a codebook determination method according to a first embodiment and a third embodiment of the present disclosure.
Figure 7:
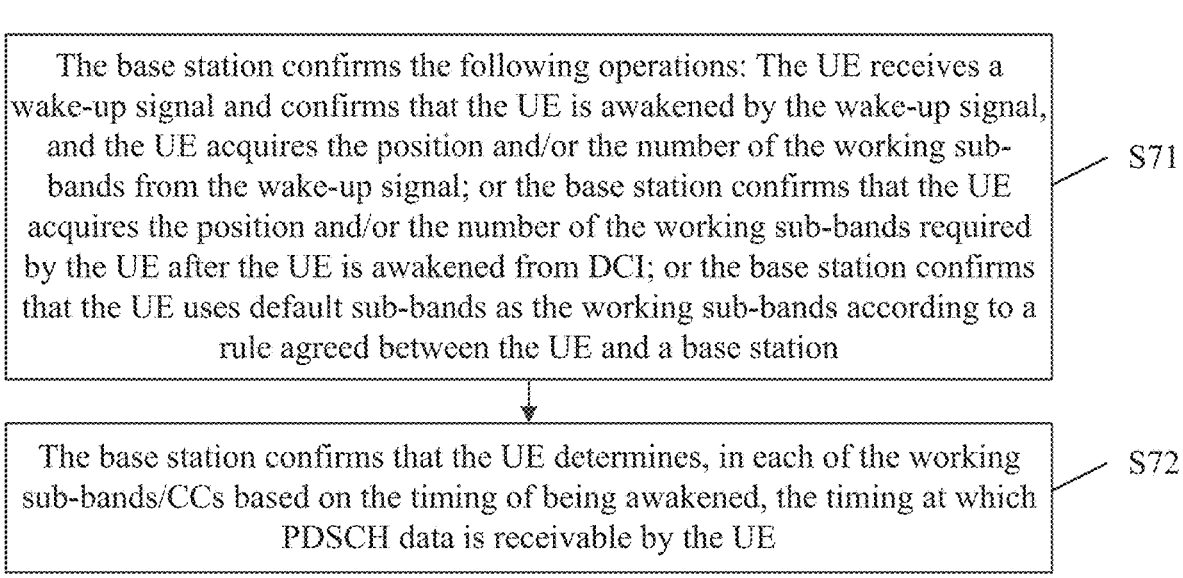
FIG. 7 is a flowchart of a codebook determination method according to a ninth embodiment of the present disclosure.

A first embodiment of the present disclosure provides a codebook determination method. As shown in FIGS. 1 and 7, the method includes steps S11 and S12.

In step S11, a UE determines, based on a timing of being awakened, a timing at which physical downlink shared channel (PDSCH) data is receivable by the UE.

In the implementation process of this step, the UE determines that a time slot in which the Hybrid Automatic Repeat reQuest-Acknowledgement (HARQ-ACK) codebook corresponding to the PDSCH is transmitted is slot n; the UE calculates, based on slot n and a configured interval k1 value set, a timing at which the PDSCH is transmittable; and the UE determines, based on the timing of being awakened, that a timing after the timing of being awakened is the timing at which the PDSCH is receivable by the UE. The timing of being awakened is a timing at which the UE receives a wake-up signal. After the timing of being awakened is after transmission of the wake-up signal is completed. The interval is described in units of slots or symbols. In this step, slot is used as an example.

In step S12, the UE forms the corresponding HARQ-ACK codebook based on the timing at which the PDSCH data is receivable.

Figure 10:
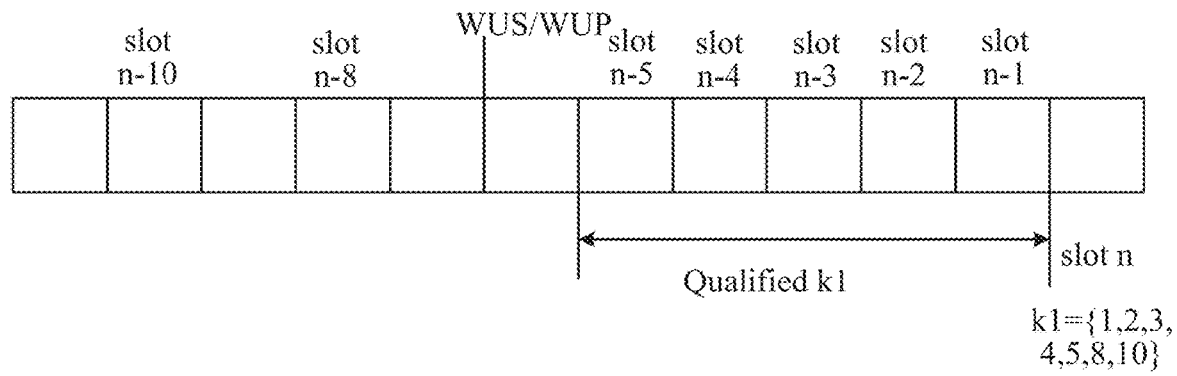
FIG. 10 is a schematic diagram illustrating the values of k1 according to the first embodiment of the present disclosure.

With reference to FIG. 10, as a further explanation of the first embodiment, it is assumed that a static codebook is configured for the UE and that the k1 value set is configured as k1={1, 2, 3, 4, 5, 8, 10}. After the UE is awakened by a WUS/WUP, as shown in FIG. 7, it is assumed that the PDSCH HARQ-ACK codebook is fed back in slot n. In this case, when a time slot in which the PDSCH is transmittable is calculated forward from slot n, it is apparent that when k1=8 or k1=10, in slot n−8 and slot n−10, the UE does not receive PDSCH data, and because a base station knows that the UE is in the sleep state, the base station does not transmit PDSCH data. Thus, in the static codebook, slots before the WUS/WUP and calculated from k1 are regarded as unqualified slots. The corresponding k1 is regarded as unqualified k1. The codebook formed for a timing at which the PDSCH is transmittable in the slots corresponding to unqualified k1 incurs large overheads. Therefore, when an HARQ-ACK codebook is formed, no HARQ-ACK codebook is formed for a possible PDSCH transmission timing in slots in which the PDSCH is transmittable among the slots corresponding to unqualified k1. As shown in FIG. 10, when k1=8, the corresponding time slot is slot n−8; when k1=10, the corresponding time slot is slot n−10. Slot n−8 and slot n−10 are before the WUS/WUP, so no HARQ-ACK codebook is formed for a possible PDSCH transmission timing in slot n−8 and slot n−10. In this manner, a relatively small static codebook is formed.

In this embodiment, the UE determines a timing at which PDSCH data is receivable among timings at which the PDSCH data is transmittable and then an HARQ-ACK codebook is formed for the timing at which the PDSCH is receivable. In this manner, a relatively small static codebook is formed, the problem in which a relatively large codebook is formed is solved, and the codebook overheads are reduced.

Figure 2:
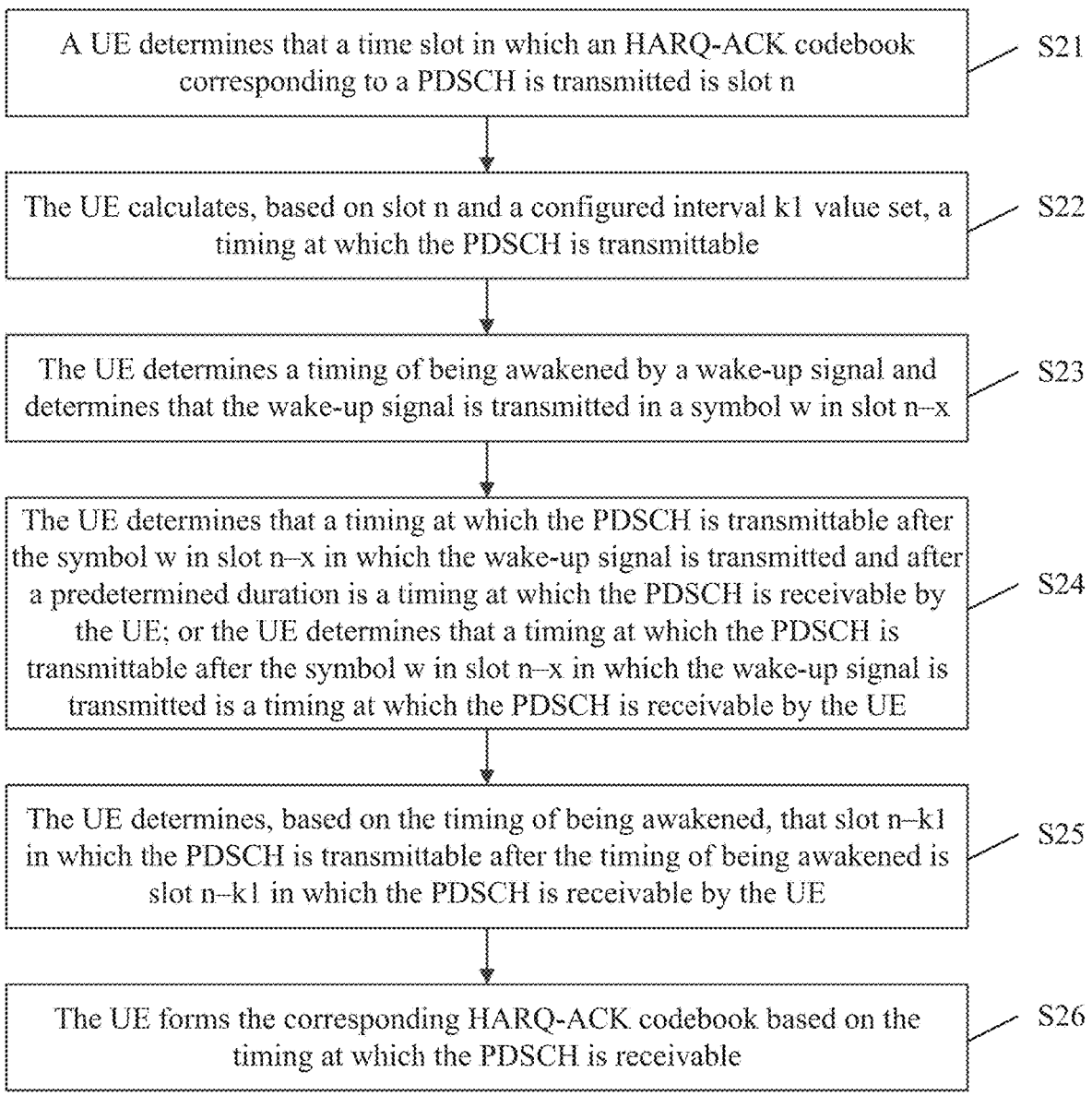
FIG. 2 is a flowchart of a codebook determination method according to a second embodiment of the present disclosure.

A second embodiment of the present disclosure provides a codebook determination method. As shown in FIG. 2, the method includes steps S21 to S26.

In step S21, a UE determines that a time slot in which an HARQ-ACK codebook corresponding to a PDSCH is transmitted is slot n.

In step S22, the UE calculates, based on slot n and a configured interval k1 value set, a timing at which the PDSCH is transmittable.

In step S23, the UE determines a timing of being awakened by a wake-up signal and determines that the wake-up signal is transmitted in a symbol w in slot n−x.

In step S24, the UE determines that a timing at which the PDSCH is transmittable after a predetermined duration starting from the symbol w in slot n−x in which the wake-up signal is transmitted is a timing at which the PDSCH is receivable by the UE; or the UE determines that a timing at which the PDSCH is transmittable after the symbol w in slot n−x in which the wake-up signal is transmitted is a timing at which the PDSCH is receivable by the UE. In this step, the predetermined duration is a predetermined number of symbols or a predetermined absolute time value.

In this step, in view that after a WUS/WUP awakens the UE, the UE needs a certain time to restore the reception and processing functions of the device for the purpose of reaching a state that satisfies the operating requirements. This time is temporarily referred to as a transition period. The transition period generally ranges from 400 μs to 2000 μs and varies depending on the capability of the UE (it is noted that a base station knows the length of the transition period required by the UE). That is, after the WUS/WUP, the UE determines that a duration of at least 400 μs to 2000 μs is required from being awakened to becoming able to operate normally. Here the duration refers to the predetermined duration T. During T, the UE cannot receive downlink data transmitted by the base station. Therefore, possible PDSCH transmission is ruled out from a static codebook during T, that is, no HARQ-ACK codebook is formed for T.

In step S25, the UE determines, based on the timing of being awakened, that a timing at which the PDSCH is transmittable after the timing of being awakened is a timing at which the PDSCH is receivable. The timing of being awakened is a timing at which the UE receives a wake-up signal.

After the timing of being awakened is after transmission of the wake-up signal is completed.

In step S26, the UE forms the corresponding HARQ-ACK codebook based on the timing at which the PDSCH is receivable.

In this embodiment, the UE determines a timing at which PDSCH data is receivable among timings at which the PDSCH data is transmittable and then an HARQ-ACK codebook is formed for the timing at which the PDSCH is receivable. In this manner, a relatively small static codebook is formed, the problem in which a relatively large codebook is formed is solved, and the codebook overheads are reduced.

A third embodiment of the present disclosure provides a codebook determination method. As shown in FIG. 1, the method includes steps S11 and S12.

In step S11, a UE determines, based on a timing of being awakened, a timing at which PDSCH data is receivable by the UE.

In the implementation process of this step, the UE determines that a time slot in which the HARQ-ACK codebook corresponding to the PDSCH is transmitted is slot n; the UE calculates, based on slot n and a configured interval k1 value set, a timing at which the PDSCH is transmittable; and the UE determines, based on the timing of being awakened, that a timing at which the PDSCH is transmittable after the timing of being awakened is the timing at which the PDSCH is receivable by the UE. The timing of being awakened is a timing at which the UE receives a wake-up signal.

After the timing of being awakened is after transmission of the wake-up signal is completed.

In step S12, the UE forms the corresponding HARQ-ACK codebook based on the timing at which the PDSCH data is receivable.

In this embodiment, the timing of being awakened includes the start point of the UE in an operating period is determined as the timing of being awakened in a discontinuous reception (DRX) mechanism. The DRX mechanism includes two states: ON and OFF. The two states occur periodically or aperiodically. After the DRX mechanism is configured for the UE, the UE operates in an ON period (for example, the UE receives/transmits data) and is off in an OFF period. In the OFF period, the UE is in the energy-saving state (for example, the UE does not receive/transmit data and is able to receive data in only a small number of specified channels). Therefore, a timing at which the PDSCH is receivable is determined in the ON period and then a codebook is formed for this timing. The codebook determination method provided in this embodiment can be used to reduce the size of codebook and solve the problem in which the codebook is relatively large.

In this embodiment, before the timing at which the PDSCH data is receivable by the UE is determined, the method further includes that the UE acquires the position and/or the number of working sub-bands for the UE after the UE is awakened; or the UE acquires the position and/or the number of component carriers (CCs) for the UE after the UE is awakened. Then, the UE performs, in each of the working sub-bands or CCs, step S11, that is, the UE determines the transmission timing at which the PDSCH data is receivable by the UE.

In this embodiment, the UE forms no HARQ-ACK codebook for a PDSCH that cannot be received normally due to the DRX mechanism. The PDSCH that cannot be received normally due to the DRX mechanism includes at least one of (1) to (3) below.

(1) If a static HARQ-ACK codebook is transmitted in slot n and the start point of the DRX ON period is in the symbol w in slot n−x (x is a non-negative integer), then in the slot before the symbol w in slot n−x or the symbol before the symbol w in slot n−x, a possible PDSCH that requires feedback of the HARQ-ACK codebook in slot n is a PDSCH that cannot be received normally.

(2) If a static HARQ-ACK codebook is transmitted in slot n and the start point of the DRX ON period is in the symbol w in slot n−x, then within t symbols (or absolute time, because sometimes the symbols and the absolute time cannot be aligned exactly) after the symbol w in slot n−x, a possible PDSCH that requires feedback of the HARQ-ACK codebook in slot n is a PDSCH that cannot be received normally.

(3) If after the start point of the DRX ON period, the UE normally operates in multiple bandwidth parts (BWPs) (also understandable as sub-bands) or multiple CCs, then the UE requires multiple transition periods. Each transition period is from the start point of the DRX ON period to the time point at which the UE becomes able to operate normally in a corresponding sub-band or CC. PDSCHs that cannot be received normally in these sub-bands or CCs may be determined based on the transition periods corresponding to the respective sub-bands or CCs or may be determined based on the maximum transition period among the transition periods corresponding to these sub-bands or CCs.

Figure 3:
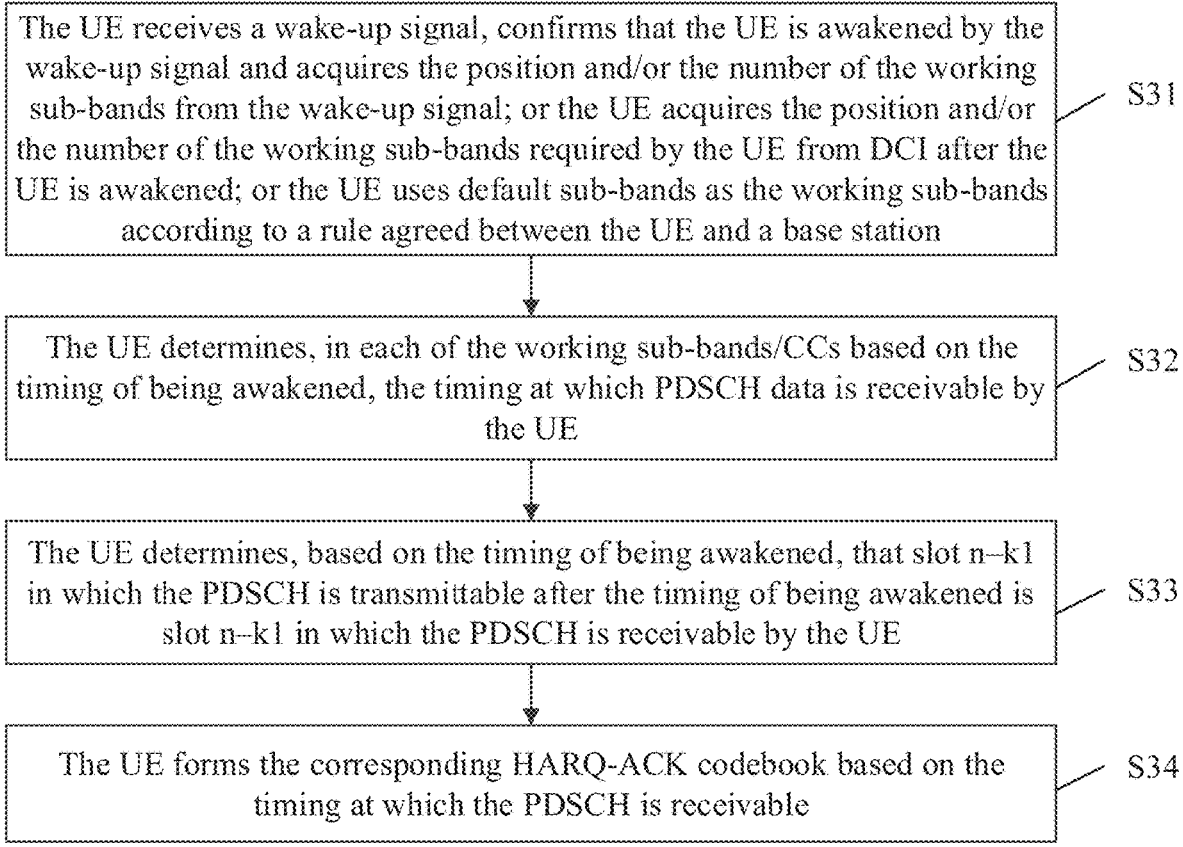
FIG. 3 is a flowchart of a codebook determination method according to a fourth embodiment of the present disclosure.

A fourth embodiment of the present disclosure provides a codebook determination method. As shown in FIG. 3, the method includes steps S31 to S34.

In step S31, the UE receives a wake-up signal, confirms that the UE is awakened by the wake-up signal and acquires the position and/or the number of the working sub-bands from the wake-up signal; or the UE acquires the position and/or the number of the working sub-bands required by the UE from downlink control information (DCI) after the UE is awakened; or the UE uses default sub-bands as the working sub-bands according to a rule agreed between the UE and a base station.

In step S32, the UE determines, in each of the working sub-bands/CCs based on the timing of being awakened, the timing at which PDSCH data is receivable by the UE. In an embodiment, the UE determines that a time slot in which an HARQ-ACK codebook corresponding to the PDSCH is transmitted is slot n; the UE calculates, based on slot n and a configured interval k1 value set, a timing at which the PDSCH is transmittable; and the UE determines the timing of being awakened by the wake-up signal and determines that the wake-up signal is transmitted in a symbol w in slot n−x. Moreover, the UE determines that slot n−k1 in which the PDSCH is transmittable after a predetermined duration starting from the symbol w in slot n−x in which the wake-up signal is transmitted is slot n−k1 in which the PDSCH is receivable by the UE; or the UE determines that slot n−k1 in which the PDSCH is transmittable after the symbol w in slot n−x in which the wake-up signal is transmitted is slot n−k1 in which the PDSCH is receivable by the UE. In this step, the predetermined duration is a predetermined number of symbols or a predetermined absolute time value.

In step S33, the UE determines, based on the timing of being awakened, that a timing at which the PDSCH is transmittable after the timing of being awakened is the timing at which the PDSCH is receivable. The timing of being awakened is a timing at which the UE receives the wake-up signal. After the timing of being awakened is after transmission of the wake-up signal is completed.

In step S34, the UE forms the corresponding HARQ-ACK codebook based on the timing at which the PDSCH is receivable.

In this embodiment of the present disclosure, the UE acquires the position and/or the number of the working sub-bands, determines, in the working sub-bands/CCs, the timing at which PDSCH data is receivable by the UE, and forms the corresponding HARQ-ACK codebook based on this timing. In this manner, the codebook overheads are reduced.

Figure 4:
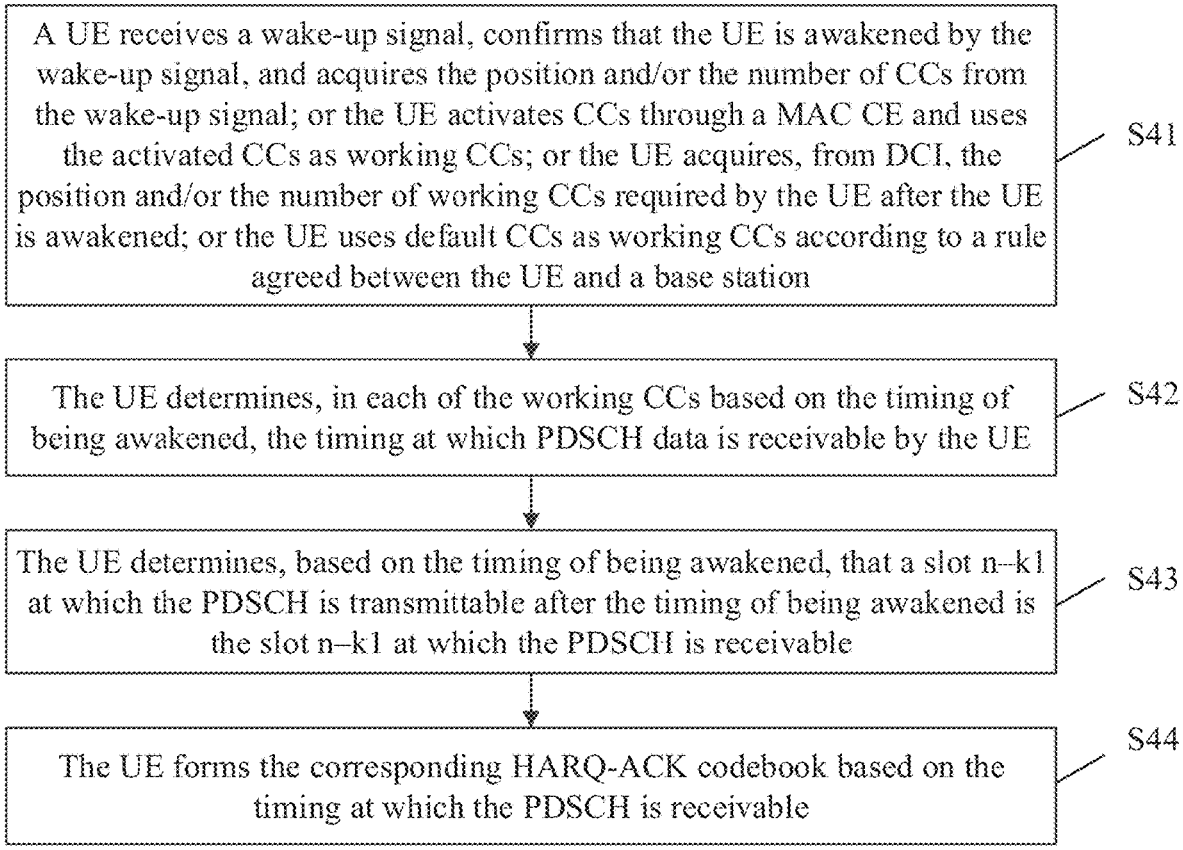
FIG. 4 is a flowchart of a codebook determination method according to a fifth embodiment of the present disclosure.

A fifth embodiment of the present disclosure provides a codebook determination method. As shown in FIG. 4, the method includes steps S41 to S44.

In step S41, a UE receives a wake-up signal, confirms that the UE is awakened by the wake-up signal, and acquires the position and/or the number of CCs from the wake-up signal; or the UE activates CCs through a medium access control (MAC) control element (CE) and uses the activated CCs as working CCs; or the UE acquires, from DCI, the position and/or the number of working CCs required by the UE after the UE is awakened; or the UE uses default CCs as working CCs according to a rule agreed between the UE and a base station.

In step S42, the UE determines, in each of the working CCs based on the timing of being awakened, the timing at which PDSCH data is receivable by the UE. In an embodiment, the UE determines that a time slot in which an HARQ-ACK codebook corresponding to the PDSCH is transmitted is slot n; the UE calculates, based on slot n and a configured interval k1 value set, a timing at which the PDSCH is transmittable; and the UE determines the timing of being awakened by the wake-up signal and determines that the wake-up signal is transmitted in a symbol w in slot n−x. Moreover, the UE determines that slot n−k1 in which the PDSCH is transmittable after a predetermined duration starting from the symbol w in slot n−x in which the wake-up signal is transmitted is slot n−k1 in which the PDSCH is receivable by the UE; or the UE determines that slot n−k1 in which the PDSCH is transmittable after the symbol w in slot n−x in which the wake-up signal is transmitted is slot n−k1 in which the PDSCH is receivable by the UE. In this step, the predetermined duration is a predetermined number of symbols or a predetermined absolute time value.

In step S43, the UE determines, based on the timing of being awakened, that a timing at which the PDSCH is transmittable after the timing of being awakened is the timing at which the PDSCH is receivable. The timing of being awakened is a timing at which the UE receives the wake-up signal. After the timing of being awakened is after transmission of the wake-up signal is completed.

In step S44, the UE forms the corresponding HARQ-ACK codebook based on the timing at which the PDSCH is receivable.

An extension of the codebook determination method in this embodiment is well applicable to the case where the UE operates in multiple carriers or multiple sub-bands.

In the preceding method (including processing of a static codebook in DRX or the WUS), after the WUS awakens the UE, the position and/or the number of the working sub-bands of the UE or the position and/or the number of the CCs of the UE is different from that before the UE sleeps.

As a result, after the WUS awakens the UE, PDSCHs that cannot be received normally occur because the position and/or the number of the working sub-bands or the position and/or the number of the CCs (the following uses CCs as an example, and the case of sub-bands is similar to the case of CCs) has changed. The solution of forming a corresponding static HARQ-ACK codebook for every timing at which PDSCH is transmittable is clearly unreasonable. The improved mechanism is to redetermine, for the UE awakened by the WUS, a corresponding static codebook based on the position and/or the number of new CCs (sub-bands). This case includes that after the UE is awakened, the position and/or the number of the CCs configured for the UE may not change (may be the same as that before sleep), but since the WUS notifies the UE of the position and/or the number of the working CCs of the UE after the UE is awakened by the WUS, the static codebook is determined using the position and/or the number of the notified CCs after the UE is awakened.

For example, the UE is originally configured with two CCs (denoted by CC0 and CC1) and then sleeps. After the UE is awakened by the WUS, the WUS notifies that the UE operates in CC0. In this case, CC1 is not used after the UE is awakened this time. (Here two cases are included. One case is that CC1 is removed. The other case is that the UE is still configured with CC1, but the UE temporarily does not operate in CC1 after being awakened this time.) Thus, after the UE is awakened, the static codebook should not include a static codebook corresponding to a PDSCH transmittable in CC1; in other words, after the UE is awakened, a static codebook corresponding to a PDSCH transmittable is determined based on the CCs or sub-bands in which the UE operates after the UE is awakened. A static codebook corresponding to CC0 is determined using the preceding method. In this case, the WUS indicates the position and the number of the working CCs in which the UE operates after being awakened. As regards sub-bands, the WUS indicates the position and the number of the working sub-bands in which the UE operates after being awakened. That is, the WUS not only awakens the UE so that the UE can operate, but also notifies the UE of information about the working sub-bands and/or information about the working CCs.

For example, the UE is originally configured with two CCs (denoted by CC0 and CC1) and then sleeps. After the UE is awakened by the WUS, the WUS notifies that the UE operates in CC0, CC1 and CC2. After the UE is awakened this time, the UE needs to form an HARQ-ACK codebook for a timing at which a PDSCH is transmittable in CC0, an HARQ-ACK codebook for a timing at which the PDSCH is transmittable in CC1 and an HARQ-ACK codebook for a timing at which the PDSCH is transmittable in CC2. After the UE is awakened by the WUS, the UE activates CCs through a MAC CE (the activated CCs are the working CCs), or the UE acquires the position and the number of the working CCs (or sub-bands) required by the UE from DCI after the UE is awakened, and then the UE operates in the indicated CCs (or sub-bands).

Of course, it is also feasible to determine information about the working sub-bands and/or information about the working CCs in an agreed manner after the UE is awakened. Further, since the WUS may be rather simple information (for example, a sequence) that cannot carry more information, if the WUS does not contain the position and the number of the working CCs (or sub-bands) after the UE is awakened, to reduce the WUS overheads, the base station and the UE agree that default CCs (or sub-bands), for example, a CC (or sub-band), a primary CC or an initial sub-band where the WUS is located, are used.

In this embodiment, the UE determines a timing at which PDSCH data is receivable among timings at which the PDSCH data is transmittable and then an HARQ-ACK codebook is formed for the timing at which the PDSCH is receivable. In this manner, the size of static codebook is reduced, the problem in which the codebook is relatively large is solved, and the codebook overheads are reduced.

Figure 5:
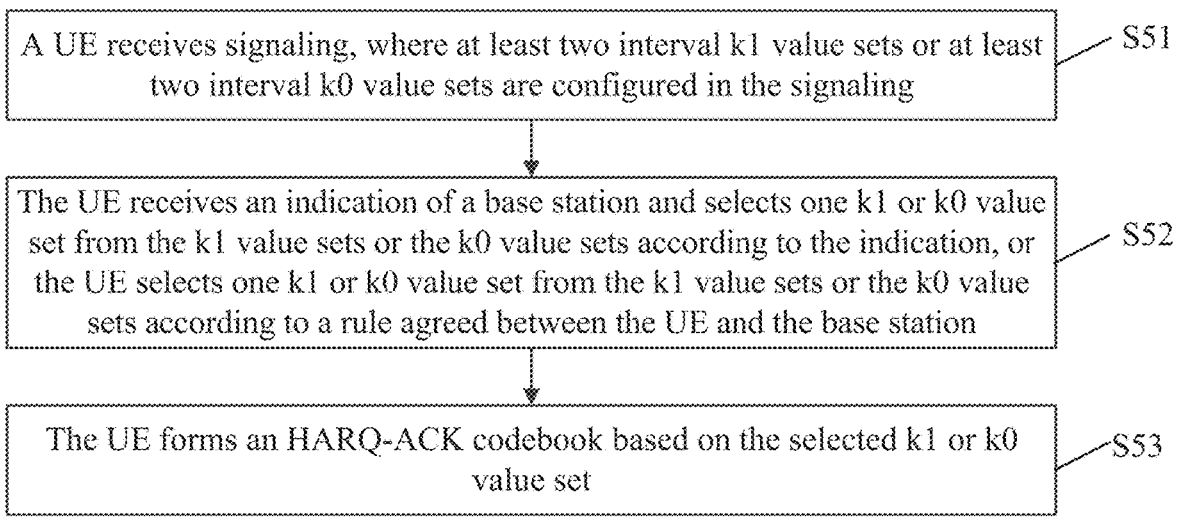
FIG. 5 is a flowchart of a codebook determination method according to a sixth embodiment and a seventh embodiment of the present disclosure.

A sixth embodiment of the present disclosure provides a codebook determination method. As shown in FIG. 5, the method includes steps S51 to S53.

In step S51, a UE receives signaling, where at least two interval k1 value sets or at least two interval k0 value sets are configured in the signaling.

In step S52, the UE receives an indication of a base station and selects one k1 or k0 value set from the k1 value sets or the k0 value sets according to the indication, or the UE selects one k1 or k0 value set from the k1 value sets or the k0 value sets according to a rule agreed between the UE and the base station. Here it is feasible to configure only one k1 value set or only one k0 value set for the UE in the signaling. In this case, the k1 value set and the k0 value set are still determined, as described below, based on a subcarrier spacing, and the k1 value set or the k0 value set to be used is no longer selected according to the indication of the base station.

In step S53, the UE forms an HARQ-ACK codebook based on the selected k1 or k0 value set.

k1 satisfies that in response to the end of a PDSCH received by the UE being in slot n, an HARQ-ACK corresponding to the PDSCH is transmitted in slot n+k1. k0 satisfies that in response to the end of downlink control information (DCI) which is used for scheduling PDSCH and received by the UE being in slot n, the PDSCH corresponding to the DCI is transmitted in slot n+k0.

In this embodiment, the k1 value sets and the k0 value sets may be determined based on a subcarrier spacing. When the subcarrier spacing used is 15 kHz, at least one k1 value set of the configured k1 value sets contains elements composed of 0 and/or 1, and at least one k0 value set of the configured k0 value sets contains elements composed of 0 and/or 1.

When the subcarrier spacing used is 30 kHz, at least one k1 value set of the configured k1 value sets contains elements composed of one or more of 0, 1 and 2, and at least one k0 value set of the configured k0 value sets contains elements composed of one or more of 0, 1 and 2.

When the subcarrier spacing used is 60 kHz, at least one k1 value set of the configured k1 value sets contains elements composed of one or more of 0, 1, 2, 3 and 4, and at least one k0 value set of the configured k0 value sets contains elements composed of one or more of 0, 1, 2, 3 and 4.

When the subcarrier spacing used is 120 kHz, at least one k1 value set of the configured k1 value sets contains elements composed of one or more of 0, 1, 2, 3, 4, 5, 6, 7 and 8, and at least one k0 value set of the configured k0 value sets contains elements composed of one or more of 0, 1, 2, 3, 4, 5, 6, 7 and 8.

When the subcarrier spacing used is 240 kHz, at least one k1 value set of the configured k1 value sets contains elements composed of one or more of 0, 1, 2, 3, 4, 5, 6, 7, 8, 9, 10, 11, 12, 13, 14, 15 and 16, and at least one k0 value set of the configured k0 value sets contains elements composed of one or more of 0, 1, 2, 3, 4, 5, 6, 7, 8, 9, 10, 11, 12, 13, 14, 15 and 16.

Optionally, the k1 value set or the k0 value set is determined in the following manner: The base station configures one corresponding k1 value set or k0 value set for one traffic type. One k1 value set or k0 value set configured for ultra-reliable low-latency communication (URLLC) traffic is determined based on a subcarrier spacing.

A seventh embodiment of the present disclosure provides a codebook determination method. As shown in FIG. 5, the method includes steps S51 to S53.

In step S51, a UE receives signaling, where at least two interval k1 value sets or at least two interval k0 value sets are configured in the signaling.

In step S52, the UE receives an indication of a base station and selects one k1 or k0 value set from the k1 value sets or the k0 value sets according to the indication, or the UE selects one k1 or k0 value set from the k1 value sets or the k0 value sets according to a rule agreed between the UE and the base station. In this step, the UE selects one k1 or k0 value set from the k1 value sets or the k0 value sets according to the indication. In an embodiment, the UE receives a traffic type indicated by the base station and selects one k1 or k0 value set based on the traffic type. The method of the indication includes indication through a parameter in DCI or through a MAC CE. When the traffic type is URLLC, one k1 or k0 value set determined based on a subcarrier spacing is selected.

In step S53, the UE forms an HARQ-ACK codebook based on the selected k1 or k0 value set. k1 satisfies that in response to the end of a PDSCH received by the UE being in slot n, an HARQ-ACK corresponding to the PDSCH is transmitted in slot n+k1. k0 satisfies that in response to the end of downlink control information (DCI) which is used for scheduling PDSCH and received by the UE being in slot n, the PDSCH corresponding to the DCI is transmitted in slot n+k0.

The UE selects one k1 or k0 value set from the k1 value sets or the k0 value sets according to the rule agreed between the UE and the base station in the following manner: The UE and the base station agree on a selection method, where when the traffic type is URLLC, one k1 or k0 value set determined based on the subcarrier spacing is selected.

Selecting one k1 or k0 value set from the k1 value sets or the k0 value sets includes one or more of the following: (1) performing selection based on a DCI format, where when the DCI format corresponds to URLLC, one k1 or k0 value set determined based on the subcarrier spacing is selected as the one k1 or k0 value set; (2) performing selection based on the type of traffic scheduled through DCI, where when the traffic scheduled through the DCI is URLLC, one k1 or k0 value set determined based on the subcarrier spacing is selected as the one k1 or k0 value set; (3) performing selection based on the type of an RNTI used by DCI, where when the RNTI used by the DCI is the RNRI of URLLC traffic, one k1 or k0 value set determined based on the subcarrier spacing is selected as the one k1 or k0 value set; or (4) performing selection based on a working BWP of the UE, where when the working BWP of the UE is a bandwidth of URLLC traffic, one k1 or k0 value set determined based on the subcarrier spacing is selected as the one k1 or k0 value set.

Here selection of one k1 value set is used as an example. In this embodiment, the base station configures two or more k1 value sets (corresponding to different traffic requirements) for the UE, and the base station instructs the UE to use one k1 value set, or the base station and the UE agree on a rule according to which the UE selects one k1 value set. The UE determines an HARQ-ACK codebook based on the determined k1 value set. k1 satisfies that in response to the end of a PDSCH received by the UE being in slot n, an HARQ-ACK corresponding to the PDSCH is transmitted in slot n+k1.

For example, the base station configures one k1 value set for the URLLC traffic of the UE and one k1 value set for the Enhanced Mobile Broadband (eMBB) traffic of the UE, and then according to the indication of the base station or the rule agreed with the base station, the UE uses the k1 value set corresponding to the URLLC traffic in the case of the URLLC traffic and uses the k1 value set corresponding to the eMBB traffic in the case of the eMBB traffic. The UE determines an HARQ-ACK codebook based on the determined k1 value set.

The implementation process includes that the base station indicates, through physical-layer signaling, the k1 value set used by the UE. For example, the base station indicates the k1 value set by adding new bits in the DCI or by using some existing bit fields.

In an embodiment, the base station and the UE agree on a corresponding k1 value set based on a DCI format. For example, when the base station schedules data for the UE by using a first DCI format (named for ease of description of a DCI format), the base station and the UE agree that a first k1 value set (named for ease of description of a k1 value set) configured for the UE is used; when the base station schedules data for the UE by using a second DCI format (named for ease of description of another DCI format), the base station and the UE agree that a second k1 value set (named for ease of description of another k1 value set) configured for the UE is used. Alternatively, multiple DCI formats correspond to a first k1 value set and some other DCI formats correspond to a second k1 value set.

In an embodiment, the base station and the UE agree that in the case where in the data corresponding to an HARQ-ACK codebook, some data is scheduled through the first DCI format and some data is scheduled through the second DCI format, the HARQ-ACK codebook is determined based on a union of the first k1 value set and the second k1 value set.

In an embodiment, the base station and the UE agree that one k1 value set is determined based on a traffic type indicated in a DCI format. For example, the base station transmits the DCI for scheduling data for the UE and, meanwhile, adds information indicating the type of scheduled traffic in the DCI; the UE learns the type of the scheduled traffic after parsing the DCI and then selects one k1 value set based on the type of the traffic.

In an embodiment, the base station and the UE agree that one k1 value set is determined based on the type of an RNTI used by a DCI format. For example, the base station transmits the DCI for scheduling data for the UE and meanwhile, the DCI is scrambled using RNTI1 (an agreed RNTI); after parsing the DCI, the UE selects one k1 value set based on the type of the RNTI. For example, a first k1 value set is selected when RNTI1 is used, and a second k1 value set is selected when RNTI2 is used.

In an embodiment, different k1 value sets are configured for different BWPs (also referred to as sub-bands). A corresponding k1 value set is selected based on a working BWP of the UE. For example, the UE is configured with two sub-bands. One is used for transmission of URLLC traffic, and the other is used for transmission of eMBB traffic. In this case, a first k1 value set is used in transmission of the URLLC traffic, and a second k1 value set is used in transmission of the eMBB traffic. This manner may be summarized as follows: The base station configures different k1 value sets for different sub-bands (or carriers), and then the UE determines an HARQ-ACK codebook by using a corresponding k1 value set when operating in a corresponding sub-band (or carrier). A typical scenario to which this manner is applicable is that the base station configures one sub-band for transmission of URLLC traffic and one sub-band for transmission of eMBB traffic and then configures different k1 value sets for different sub-bands to adapt to the features of the traffic scheduled in the different sub-bands.

In an embodiment, selection of one k0 value set is used as an example. The principle of selection of one k0 value set is the same as the principle of selection of one k1 value set. In this embodiment, the base station configures two or more k0 value sets (corresponding to different traffic requirements) for the UE, and the base station instructs the UE to use one k0 value set, or the base station and the UE agree on a rule according to which the UE selects one k0 value set. The UE determines an HARQ-ACK codebook based on the determined k0 value set. k0 satisfies that in response to the end of a PDSCH received by the UE being in slot n, an HARQ-ACK corresponding to the PDSCH is transmitted in slot n+k0.

For example, the base station configures one k0 value set for the URLLC traffic of the UE and one k0 value set for the eMBB traffic of the UE, and then according to the indication of the base station or the rule agreed with the base station, the UE uses the k0 value set corresponding to the URLLC traffic in the case of the URLLC traffic and uses the k0 value set corresponding to the eMBB traffic in the case of the eMBB traffic. The UE determines an HARQ-ACK codebook based on the determined k0 value set.

The base station indicates, through physical-layer signaling, the k0 value set used by the UE. For example, the base station indicates the k0 value set by adding new bits in the DCI or by using some existing bit fields.

In an embodiment, the base station and the UE agree on a corresponding k0 value set based on a DCI format. For example, when the base station schedules data for the UE by using a first DCI format (named for ease of description of a DCI format), the base station and the UE agree that a first k0 value set (named for ease of description of a k0 value set) configured for the UE is used; when the base station schedules data for the UE by using a second DCI format (named for ease of description of another DCI format), the base station and the UE agree that a second k0 value set (named for ease of description of another k0 value set) configured for the UE is used. Alternatively, multiple DCI formats correspond to a first k0 value set and some other DCI formats correspond to a second k0 value set.

Further, the base station and the UE agree that in the case where in the data corresponding to an HARQ-ACK codebook, some data is scheduled through the first DCI format and some data is scheduled through the second DCI format, the HARQ-ACK codebook is determined based on a union of the first k0 value set and the second k0 value set.

In an embodiment, the base station and the UE agree that one k0 value set is determined based on a traffic type indicated in a DCI format. For example, the base station transmits the DCI for scheduling data for the UE and, meanwhile, adds information indicating the type of scheduled traffic in the DCI; the UE learns the type of the scheduled traffic after parsing the DCI and then selects one k0 value set based on the type of the traffic.

In an embodiment, the base station and the UE agree that one k0 value set is determined based on the type of an RNTI used by a DCI format. For example, the base station transmits the DCI for scheduling data for the UE and meanwhile, the DCI is scrambled using RNTI1 (an agreed RNTI); after parsing the DCI, the UE selects one k0 value set based on the type of the RNTI. For example, a first k0 value set is selected when RNTI1 is used, and a second k0 value set is selected when RNTI2 is used.

In an embodiment, different k0 value sets are configured for different BWPs (also referred to as sub-bands). A corresponding k0 value set is selected based on a working BWP of the UE. For example, the UE is configured with two sub-bands. One is used for transmission of URLLC traffic, and the other is used for transmission of eMBB traffic. In this case, a first k0 value set is used in transmission of the URLLC traffic, and a second k0 value set is used in transmission of the eMBB traffic. This manner may be summarized as follows: The base station configures different k0 value sets for different sub-bands (or carriers), and then the UE determines an HARQ-ACK codebook by using a corresponding k0 value set when operating in a corresponding sub-band (or carrier). A typical scenario to which this manner is applicable is that the base station configures one sub-band for transmission of URLLC traffic and one sub-band for transmission of eMBB traffic and then configures different k0 value sets for different sub-bands to adapt to the features of the traffic scheduled in the different sub-bands.

Figure 6:
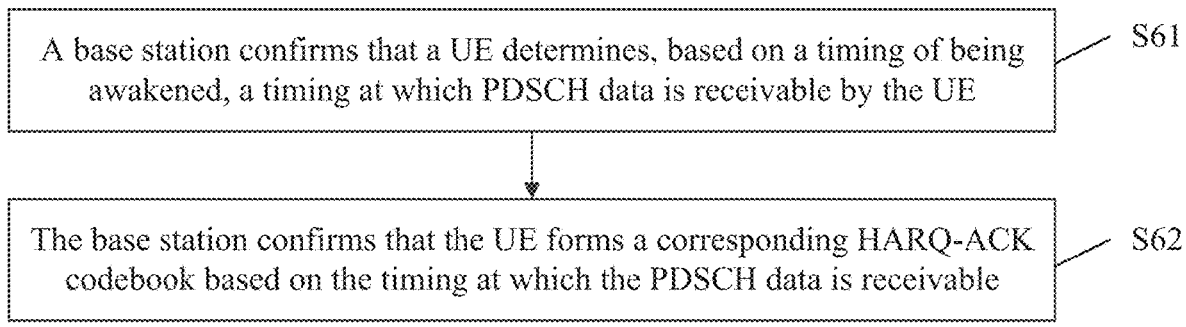
FIG. 6 is a flowchart of a codebook determination method according to an eighth embodiment of the present disclosure.

An eighth embodiment of the present disclosure provides a codebook determination method. As shown in FIG. 6, the method includes steps S61 and S62.

In step S61, a base station confirms that a UE determines, based on a timing of being awakened, a timing at which PDSCH data is receivable by the UE. In this step, the base station confirms that the UE determines that a time slot in which the HARQ-ACK codebook corresponding to the PDSCH is transmitted is slot n; confirms that the UE calculates, based on slot n and a configured interval k1 value set, a timing at which the PDSCH is transmittable; and confirms that the UE determines, based on the timing of being awakened, that a timing at which the PDSCH is transmittable after the timing of being awakened is the timing at which the PDSCH is receivable by the UE. The timing of being awakened is a timing at which the UE receives a wake-up signal.

In step S62, the base station confirms that the UE forms a corresponding HARQ-ACK codebook based on the timing at which the PDSCH data is receivable.

In this embodiment, the timing of being awakened may also be the start point of the UE in an operating period in a DRX mechanism.

In an embodiment, the UE determines, based on the timing of being awakened, that a timing at which the PDSCH is transmittable after the timing of being awakened is the timing at which the PDSCH is receivable. In an embodiment, the UE determines the timing of being awakened by a wake-up signal and determines that the wake-up signal is transmitted in a symbol w in slot n−x. Moreover, the UE determines that slot n−k1 in which the PDSCH is transmittable after a predetermined duration starting from the symbol w in slot n−x in which the wake-up signal is transmitted is slot n−k1 in which the PDSCH is receivable by the UE; or the UE determines that slot n−k1 in which the PDSCH is transmittable after the symbol w in slot n−x in which the wake-up signal is transmitted is slot n−k1 in which the PDSCH is receivable by the UE. The predetermined duration is a predetermined number of symbols or a predetermined absolute time value.

A ninth embodiment of the present disclosure provides a codebook determination method. As shown in FIG. 7, the method includes steps S71 and S72.

In step S71, the base station confirms the following operations: The UE receives a wake-up signal and confirms that the UE is awakened by the wake-up signal, and the UE acquires the position and/or the number of the working sub-bands from the wake-up signal; or the base station confirms that the UE acquires the position and/or the number of the working sub-bands required by the UE after the UE is awakened from DCI; or the base station confirms that the UE uses default sub-bands as the working sub-bands according to a rule agreed between the UE and a base station.

In step S72, the base station confirms that the UE determines, in each of the working sub-bands/CCs based on the timing of being awakened, the timing at which PDSCH data is receivable by the UE.

A tenth embodiment of the present disclosure provides a codebook determination method. As shown in FIG. 8, the method includes steps S81 and S82.

In step S81, the base station confirms the following operations: A UE receives a wake-up signal and confirms that the UE is awakened by the wake-up signal, and the UE acquires the position and/or the number of CCs from the wake-up signal; or the base station confirms that the UE activates CCs through a MAC CE and uses the activated CCs as working CCs; or the base station confirms that the UE acquires, from DCI, the position and/or the number of working CCs required by the UE after the UE is awakened; or the base station confirms that the UE uses default CCs as working CCs according to a rule agreed between the UE and a base station.

In step S82, the base station confirms that the UE determines, in each of the working CCs based on the timing of being awakened, the timing at which PDSCH data is receivable by the UE.

An eleventh embodiment of the present disclosure provides a codebook determination method. As shown in FIG. 9, the method includes steps S91 to S93.

In step S91, a base station configures at least two interval k1 value sets or at least two interval k0 value sets for a UE.

In an embodiment, the base station configures the at least two interval k1 value sets or the at least two interval k0 value sets for the UE in the following manner: The base station configures one corresponding k1 value set or k0 value set for one traffic type. One k1 value set or k0 value set configured for URLLC traffic is determined based on a subcarrier spacing.

In step S92, the base station instructs the UE to select one k1 or k0 value set from the k1 value sets or the k0 value sets or determines that the UE selects one k1 or k0 value set from the k1 value sets or the k0 value sets according to a rule agreed between the UE and the base station. The base station instructs, in the following manner, the UE to select one k1 or k0 value set from the k1 value sets or the k0 value sets: The base station indicates one k1 or k0 value set to the UE; or the base station indicates a traffic type of the UE to enable the UE to select one k1 or k0 value set based on the traffic type. Selecting one k1 or k0 value set from the k1 value sets or the k0 value sets includes one or more of the following: performing selection based on a DCI format, where when the DCI format corresponds to URLLC, one k1 or k0 value set determined based on the subcarrier spacing is selected; performing selection based on the type of traffic scheduled through DCI, where when the traffic scheduled through the DCI is URLLC, one k1 or k0 value set determined based on the subcarrier spacing is selected; performing selection based on the type of an RNTI used by DCI, where when the RNTI used by the DCI is the RNRI of URLLC traffic, one k1 or k0 value set determined based on the subcarrier spacing is selected; and performing selection based on a working BWP of the UE, where when the working BWP of the UE is a bandwidth of URLLC traffic, one k1 or k0 value set determined based on the subcarrier spacing is selected. The method of the indication includes indication through a parameter in DCI or through a MAC CE. In an embodiment, when the traffic type is URLLC, one k1 or k0 value set determined based on the subcarrier spacing is selected.

The base station determines that the UE selects one k1 or k0 value set from the k1 value sets or the k0 value sets according to a rule agreed between the UE and the base station. In an embodiment, the UE and the base station agree on a rule, where when the traffic type is URLLC, one k1 or k0 value set determined based on the subcarrier spacing is selected.

In step S93, the base station determines that the UE forms an HARQ-ACK codebook based on the selected k1 or k0 value set.

k1 satisfies that in response to the end of a PDSCH received by the UE being in slot n, an HARQ-ACK corresponding to the PDSCH is transmitted in slot n+k1. k0 satisfies that in response to the end of downlink control information (DCI) which is used for scheduling PDSCH and received by the UE being in slot n, the PDSCH corresponding to the DCI is transmitted in slot n+k0.

In this embodiment, when the base station configures the k1 value sets or the k0 value sets for the UE, the method further includes determining the k1 value sets and the k0 value sets based on a subcarrier spacing.

When the subcarrier spacing used is 15 kHz, at least one k1 value set contains an element composed of 0 or contains elements composed of 0 and/or 1, and at least one k0 value set contains elements composed of 0 and/or 1.

When the subcarrier spacing used is 30 kHz, at least one k1 value set contains elements composed of one or more of 0, 1 and 2, and at least one k0 value set contains elements composed of one or more of 0, 1 and 2.

When the subcarrier spacing used is 60 kHz, at least one k1 value set contains elements composed of one or more of 0, 1, 2, 3 and 4, and at least one k0 value set contains elements composed of one or more of 0, 1, 2, 3 and 4.

When the subcarrier spacing used is 120 kHz, at least one k1 value set contains elements composed of one or more of 0, 1, 2, 3, 4, 5, 6, 7 and 8, and at least one k0 value set contains elements composed of one or more of 0, 1, 2, 3, 4, 5, 6, 7 and 8.

When the subcarrier spacing used is 240 kHz, at least one k1 value set contains elements composed of one or more of 0, 1, 2, 3, 4, 5, 6, 7, 8, 9, 10, 11, 12, 13, 14, 15 and 16, and at least one k0 value set contains elements composed of one or more of 0, 1, 2, 3, 4, 5, 6, 7, 8, 9, 10, 11, 12, 13, 14, 15 and 16.

A twelfth embodiment of the present disclosure provides a codebook determination method. In the method, an HARQ-ACK codebook is determined based on a k1 value set in the following manner: When a UE is configured with a static codebook, (UE for URLLC traffic), when the UE forms the static codebook, the UE removes unqualified k1 values from the k1 value set and forms no HARQ-ACK codebook bits for the unqualified k1 values. An unqualified k1 value refers to a k1 value in the case where the interval between a PDSCH and the position where an ACK/NACK is fed back is greater than a time range L. L denotes an agreed duration. The duration may be a time range (from sending the PDSCH to receiving the ACK/NACK) required for completion of one transmission of (URLLC) traffic. For example, L=1 or 2. The unit of L may be described using, for example, slot, symbol or millisecond. Corresponding qualified k1 is the complement of unqualified k1.

Figure 11:
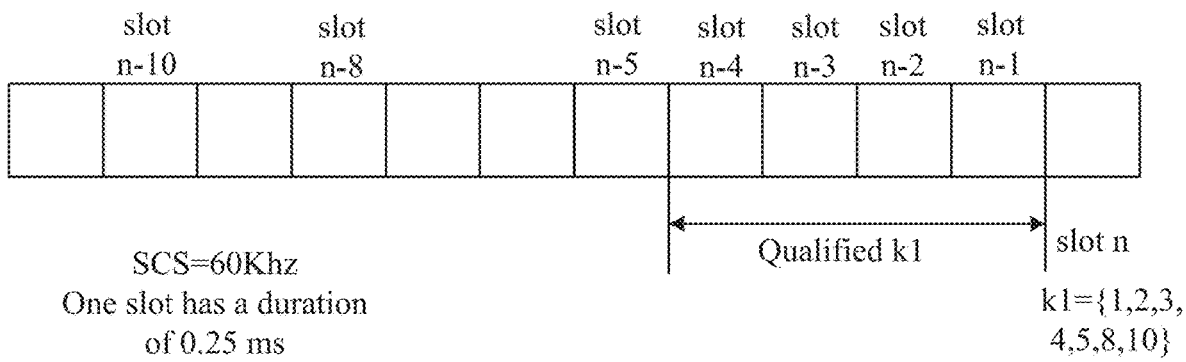
FIG. 11 is a schematic diagram illustrating the values of k1 according to a twelfth embodiment of the present disclosure.

Referring to FIG. 11, it is assumed that the corresponding subcarrier spacing (SCS) is 60 kHz, that is, the duration of each slot is 0.25 ms. The k1 values configured for the UE by the base station are {1, 2, 3, 4, 5, 8, 10}. In this case, qualified k1 values are {1, 2, 3, 4}. That is, the PDSCH is scheduled in slot n-1, slot n-2, slot n-3 and slot n-4. The time range of one traffic transmission is satisfied in the case where the UE feeds back the ACK/NACK in slot n. (That is, L is defined as 4 slots that correspond to an SCS of 60 kHz. The value of L varies the SCS. For example, L of an SCS of 30 kHz corresponds to 2 slots, and L of an SCS of 15 kHz corresponds to 1 slot.) Codebook bits are formed for qualified k1, and no codebook bit is formed for unqualified k1. For slot n-4, if the PDSCH is scheduled in the first symbol, the corresponding ACK/NACK should also be in the first symbol of slot n to satisfy the time range of delayed transmission.

A thirteenth embodiment of the present disclosure provides a codebook, determination method. In the method, an HARQ-ACK codebook is determined based on a k0 value set and a PDSCH time-domain scheduling set in the following manner: k0 is described as a slot interval between downlink grant information and the corresponding PDSCH, but since the PDSCH allows time-domain scheduling, a symbol-level interval is also required. The PDSCH time-domain scheduling set is described as a possible PDSCH time-domain scheduling set configured for a UE. That is, actual intervals between the downlink grant information and the corresponding PDSCH are determined by both k0 and the position of the start symbol in the possible PDSCH scheduling set, and the actual interval sets are obtained through permutation and combination of k0 and the possible PDSCH start symbol. A static codebook is formed based on the actual intervals. Since URLLC traffic has delay requirements, this static codebook should be optimized so that unnecessary codebook overheads can be reduced.

In the case where the UE is configured with a static codebook, when forming the static codebook, the UE removes unqualified actual interval values from the actual interval set and forms no ACK/NACK codebook bit for the unqualified actual interval values so that the overheads of the static codebook are reduced.

The unqualified actual interval values cause the sum of the following durations to exceed a time range P: after data arrives, processing duration of a transmitting end, frame or Transmission Time Interval (TTI) alignment duration (this is an average value, and sometimes this value may be 0, for example, in the case of exact alignment of the frame), data transmission duration (including the start of transmission of downlink grant information (if any) to the end of the corresponding data transmission), and decoding duration of a receiving end. Alternatively, the time range P may be simply described as from the time of arrival of the data at the transmitting end to the time of reception of the data at the receiving end. Alternatively, the time range P may be simply described as the time of arrival of the data at the transmitting end to the time of reception and decoding of the HARQ-ACK corresponding to the data at the transmitting end. The time of arrival of the data at the transmitting end is the time when the transmitting end is required to transmit the data. After this, the transmitting end starts to process the data, schedules the data through the downlink grant information and then transmits the data. The time range is P. For example, P=1 or P=2. P may be described in units of, for example, slots, symbols or milliseconds. Typically, the value of P is, for example, 1 ms or 0.5 ms, and can be converted into the number of slots or symbols corresponding to the corresponding SCS.

Figure 12:
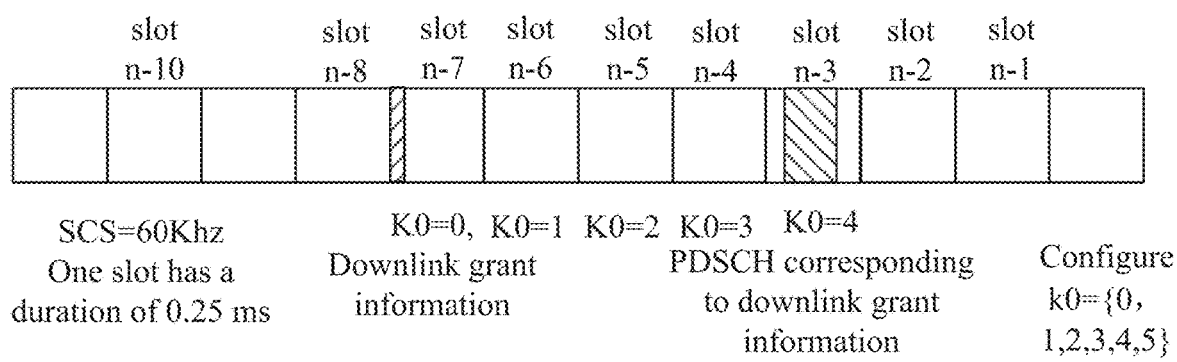
FIG. 12 is a schematic diagram illustrating the values of k0 according to a thirteenth embodiment of the present disclosure.

FIG. 12 illustrates an example of the unqualified actual interval values. It is assumed that the downlink grant information is transmitted in slot n-7, and the corresponding downlink data is transmitted starting from symbol 4 in slot n-3. In this case, the value of k0 is 4 (4 slots, that is, slot n-7+4=slot n-3), and a PDSCH is scheduled starting from symbol 4. In this manner, the interval from the downlink grant information to transmission of the corresponding downlink data exceeds 1 ms. Based on this, after other durations are added, for example, preparation duration of the downlink data, possible frame alignment duration, and duration in which the receiving end decodes the downlink data, the data is not transmitted to the receiving end within the required time (for example, 1 ms). Therefore, this combination formed by k0 of 4 and PDSCH start symbol of 4 is an unqualified combination, and the base station and the UE agree that the UE should not form a static codebook for this combination.

Figure 13:
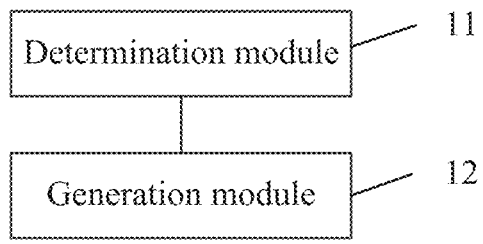
FIG. 13 is a block diagram of a codebook determination apparatus according to a fourteenth embodiment of the present disclosure.

A fourteenth embodiment of the present disclosure provides a codebook determination apparatus. As shown in FIG. 13, the apparatus includes a determination module 11 and a generation module 12.

The determination module 11 is configured to determine, based on a timing of being awakened, a timing at which PDSCH data is receivable by the UE.

The generation module 12 is configured to form the corresponding HARQ-ACK codebook based on the timing at which the PDSCH data is receivable.

In this embodiment, the determination module is configured to, when determining, based on the timing of being awakened, the timing at which the PDSCH data is receivable by the UE, determine that a time slot in which the HARQ-ACK codebook corresponding to the PDSCH is transmitted is slot n; calculate, based on slot n and a configured interval k1 value set, a timing at which the PDSCH is transmittable; and determine, based on the timing of being awakened, that a timing after the timing of being awakened is the timing at which the PDSCH is receivable by the UE. The timing of being awakened is a timing at which the UE receives a wake-up signal.

In this embodiment, the timing of being awakened is a timing at which the UE receives a wake-up signal; or the timing of being awakened is the start point of the UE in a work period in a discontinuous reception (DRX) mechanism.

In this embodiment, the determination module is configured to determine, based on the timing of being awakened, that a timing after the timing of being awakened is the timing at which the PDSCH is receivable by the UE. The determination module is configured to determine a timing of being awakened by a wake-up signal and determines that the wake-up signal is transmitted in a symbol w in slot n−x; and determine that a timing at which the PDSCH is transmittable after a predetermined duration starting from the symbol w in slot n−x in which the wake-up signal is transmitted is a timing at which the PDSCH is receivable by the UE; or determine that a timing at which the PDSCH is transmittable after the symbol w in slot n−x in which the wake-up signal is transmitted is a timing at which the PDSCH is receivable by the UE. The predetermined duration is a predetermined number of symbols or a predetermined absolute time value.

Figure 14:
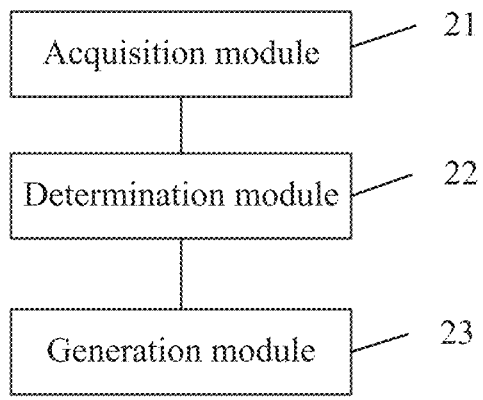
FIG. 14 is a block diagram of a codebook determination apparatus according to a fifteenth embodiment of the present disclosure.

A fifteenth embodiment of the present disclosure provides a codebook determination apparatus. As shown in FIG. 14, the apparatus includes an acquisition module 21, a determination module 22 and a generation module 23.

The acquisition module 21 is configured to acquire the position and/or the number of working sub-bands for the UE after the UE is awakened; or acquire the position and/or the number of CCs for the UE after the UE is awakened.

The determination module 22 is configured to determine, in each of the working sub-bands/CCs based on the timing of being awakened, the timing at which the PDSCH data is receivable by the UE.

The generation module 23 is configured to form the corresponding HARQ-ACK codebook based on the timing at which the PDSCH data is receivable.

In this embodiment, the acquisition module is configured to acquire the position and/or the number of working sub-bands for the UE after the UE is awakened. In an embodiment, the acquisition module is configured to receive a wake-up signal, confirm that the UE is awakened by the wake-up signal and acquire the position and/or the number of the working sub-bands from the wake-up signal; or is configured to acquire the position and/or the number of the working sub-bands required by the UE after the UE is awakened from downlink control information (DCI); or is configured to use default sub-bands as the working sub-bands according to a rule agreed with a base station.

In an embodiment, the acquisition module is configured to acquire the position and/or the number of CCs for the UE after the UE is awakened. In an embodiment, the acquisition module is configured to receive a wake-up signal, confirm that the UE is awakened by the wake-up signal, and acquire the position and/or the number of CCs from the wake-up signal; or is configured to activate CCs through a medium access control (MAC) control element (CE) and use the activated CCs as working CCs; or is configured to acquire, from DCI, the position and/or the number of working CCs required by the UE after the UE is awakened; or is configured to use default CCs as working CCs according to a rule agreed with a base station.

Figure 15:
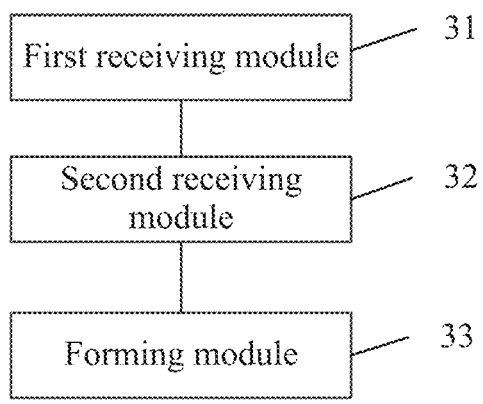
FIG. 15 is a block diagram of a codebook determination apparatus according to a sixteenth embodiment of the present disclosure.

A sixteenth embodiment of the present disclosure provides a codebook determination apparatus. As shown in FIG. 15, the apparatus includes a first receiving module 31, a second receiving module 32 and a forming module 33.

The first receiving module 31 is configured to receive signaling, where at least two interval k1 value sets or at least two interval k0 value sets are configured in the signaling.

The second receiving module 32 is configured to receive an indication of a base station and select one k1 or k0 value set from the k1 value sets or the k0 value sets according to the indication, or select one k1 or k0 value set from the k1 value sets or the k0 value sets according to a rule agreed with the base station.

The forming module 33 is configured to form an HARQ-ACK codebook based on the selected k1 or k0 value set.

Figure 16:
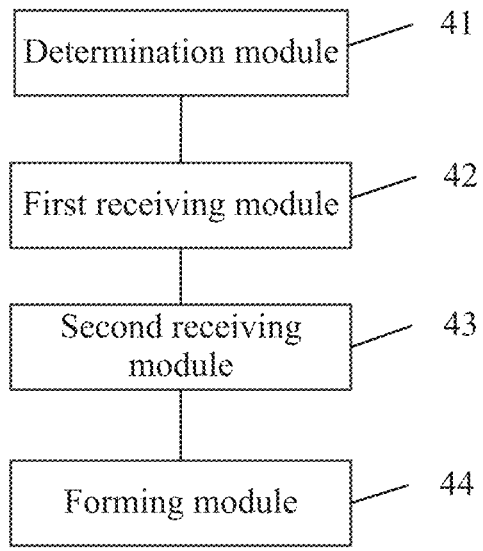
FIG. 16 is a block diagram of a codebook determination apparatus according to a seventeenth embodiment of the present disclosure.

A seventeenth embodiment of the present disclosure provides a codebook determination apparatus. As shown in FIG. 16, the apparatus includes a determination module 41, a first receiving module 42, a second receiving module 43 and a forming module 44.

The determination module 41 is configured to determine the k1 value sets and the k0 value sets based on a subcarrier spacing.

The first receiving module 42 is configured to receive signaling, where at least two interval k1 value sets or at least two interval k0 value sets are configured in the signaling.

The second receiving module 43 is configured to receive an indication of a base station and selects one k1 or k0 value set from the k1 value sets or the k0 value sets according to the indication, or select one k1 or k0 value set from the k1 value sets or the k0 value sets according to a rule agreed with the base station.

The forming module 44 is configured to form an HARQ-ACK codebook based on the selected k1 or k0 value set.

In this embodiment, the determination module is configured such that when the subcarrier spacing used is 15 kHz, at least one k1 value set of the configured k1 value sets contains an element composed of 0 or contains elements composed of 0 and/or 1, and at least one k0 value set of the configured k0 value sets contains an element composed of 0 or contains elements composed of 0 and/or 1.

In this embodiment, the determination module is configured such that when the subcarrier spacing used is 30 kHz, at least one k1 value set contains elements composed of one or more of 0 and/or 1 or contains elements composed of one or more of 0, 1 and 2, and at least one k0 value set contains elements composed of one or more of 0 and/or 1 or contains elements composed of one or more of 0, 1 and 2. In this embodiment, the determination module is configured such that when the subcarrier spacing used is 60 kHz, at least one k1 value set contains elements composed of one or more of 0, 1, 2 and 3 or contains elements composed of one or more of 0, 1, 2, 3 and 4, and at least one k0 value set contains elements composed of one or more of 0, 1, 2 and 3 or contains elements composed of one or more of 0, 1, 2, 3 and 4. In this embodiment, the determination module is configured such that when the subcarrier spacing used is 120 kHz, at least one k1 value set contains elements composed of one or more of 0, 1, 2, 3, 4, 5, 6 and 7 or contains elements composed of one or more of 0, 1, 2, 3, 4, 5, 6, 7 and 8, and at least one k0 value set contains elements composed of one or more of 0, 1, 2, 3, 4, 5, 6 and 7 or contains elements composed of one or more of 0, 1, 2, 3, 4, 5, 6, 7 and 8. In this embodiment, the determination module is configured such that when the subcarrier spacing used is 240 kHz, at least one k1 value set contains elements composed of one or more of 0, 1, 2, 3, 4, 5, 6, 7, 8, 9, 10, 11, 12, 13, 14 and 15 or contains elements composed of one or more of 0, 1, 2, 3, 4, 5, 6, 7, 8, 9, 10, 11, 12, 13, 14, 15 and 16, and at least one k0 value set contains elements composed of one or more of 0, 1, 2, 3, 4, 5, 6, 7, 8, 9, 10, 11, 12, 13, 14 and 15 or contains elements composed of one or more of 0, 1, 2, 3, 4, 5, 6, 7, 8, 9, 10, 11, 12, 13, 14, 15 and 16.

In this embodiment, the k1 value set or the k0 value set is determined in the following manner: The base station configures one corresponding k1 value set or k0 value set for one traffic type. One k1 value set or k0 value set configured for URLLC traffic is determined based on a subcarrier spacing.

In this embodiment, the codebook determination apparatus further includes a first selection module. The first selection module is configured to select one k1 or k0 value set from the k1 value sets or the k0 value sets according to the indication. In an embodiment, the first selection module is configured to receive one k1 or k0 value set indicated by the base station; or is configured to receive a traffic type indicated by the base station and select one k1 or k0 value set based on the traffic type. The method of the indication includes indication through a parameter in DCI or through a MAC CE.

When the traffic type is URLLC, one k1 or k0 value set determined based on a subcarrier spacing is selected.

In this embodiment, a selection module is further included. The selection module is configured to select one k1 or k0 value set from the k1 value sets or the k0 value sets according to a rule agreed with the base station. In an embodiment, the selection module is configured to agree on a selection method with the base station, where when the traffic type is URLLC, one k1 or k0 value set determined based on the subcarrier spacing is selected.

When selecting one k1 or k0 value set from the k1 value sets or the k0 value sets, the selection module is configured to select one k1 or k0 value set from the k1 value sets or the k0 value sets based on a DCI format, where when the DCI format corresponds to URLLC, one k1 or k0 value set determined based on the subcarrier spacing is selected. Alternatively, the selection module is configured to select one k1 or k0 value set from the k1 value sets or the k0 value sets based on the type of traffic scheduled through DCI, where when the traffic scheduled through the DCI is URLLC, one k1 or k0 value set determined based on the subcarrier spacing is selected. Alternatively, the selection module is configured to select one k1 or k0 value set from the k1 value sets or the k0 value sets based on the type of an RNTI used by DCI, where when the RNTI used by the DCI is the RNRI of URLLC traffic, one k1 or k0 value set determined based on the subcarrier spacing is selected. Alternatively, the selection module is configured to select one k1 or k0 value set from the k1 value sets or the k0 value sets based on a working BWP of the UE, where when the working BWP of the UE is a bandwidth of URLLC traffic, one k1 or k0 value set determined based on the subcarrier spacing is selected.

Figure 17:
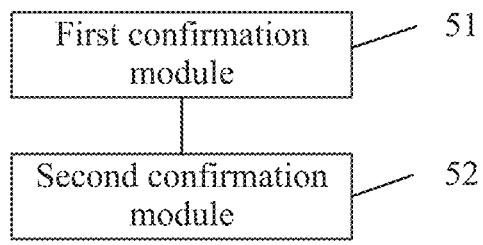
FIG. 17 is a block diagram of a codebook determination apparatus according to an eighteenth embodiment and a nineteenth embodiment of the present disclosure.
Figure 18:
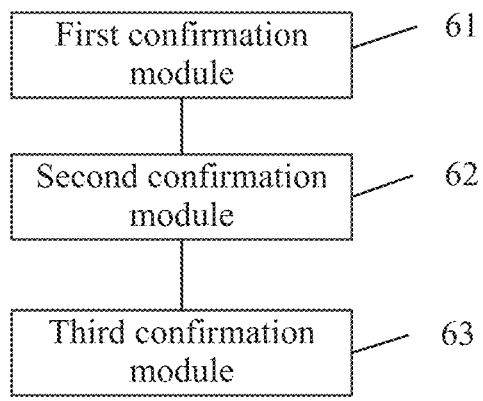
FIG. 18 is a block diagram of a codebook determination apparatus according to a twentieth embodiment of the present disclosure.

An eighteenth embodiment of the present disclosure provides a codebook determination apparatus. As shown in FIG. 17, the apparatus includes a first confirmation module 51 and a second confirmation module 52.

The first confirmation module 51 is configured to confirm that a UE determines, based on a timing of being awakened, a timing at which PDSCH data is receivable by the UE.

The second confirmation module 52 is configured to confirm that the UE form the corresponding HARQ-ACK codebook based on the timing at which the PDSCH data is receivable.

In this embodiment, the first confirmation module 51 is configured to confirm that a UE determines, based on a timing of being awakened, a timing at which PDSCH data is receivable by the UE. In an embodiment, the first confirmation module 51 is configured to confirm that the UE determines that a time slot in which the HARQ-ACK codebook corresponding to the PDSCH is transmitted is slot n; is configured to confirm that the UE calculates, based on slot n and a configured interval k1 value set, a timing at which the PDSCH is transmittable; and is configured to confirm that the UE determines, based on the timing of being awakened, that a timing at which the PDSCH is transmittable after the timing of being awakened is the timing at which the PDSCH is receivable by the UE.

The timing of being awakened is a timing at which the UE receives a wake-up signal; or the timing of being awakened is the start point of the UE in a work period in a DRX mechanism.

A nineteenth embodiment of the present disclosure provides a codebook determination apparatus. As shown in FIG. 17, the apparatus includes a first confirmation module 51 and a second confirmation module 52.

The first confirmation module 51 is configured to confirm that the UE determines that a time slot in which the HARQ-ACK codebook corresponding to the PDSCH is transmitted is slot n; is configured to confirm that the UE calculates, based on slot n and a configured interval k1 value set, a timing at which the PDSCH is transmittable; is configured to confirm that the UE determines a timing of being awakened by a wake-up signal and determines that the wake-up signal is transmitted in a symbol w in slot n–x; and is configured to confirm that the UE determines that a timing at which the PDSCH is transmittable after a predetermined duration starting from the symbol w in slot n–x in which the wake-up signal is transmitted is a timing at which the PDSCH is receivable by the UE; or is configured to confirm that the UE determines that a timing at which the PDSCH is transmittable after the symbol w in slot n–x in which the wake-up signal is transmitted is a timing at which the PDSCH is receivable by the UE.

The second confirmation module 52 is configured to confirm that the UE forms the corresponding HARQ-ACK codebook based on the timing at which the PDSCH data is receivable.

The operation in which the UE determines, based on the timing of being awakened, that a timing after the timing of being awakened is the timing at which the PDSCH is receivable by the UE includes that the UE determines a timing of being awakened by a wake-up signal and determines that the wake-up signal is transmitted in a symbol w in slot n–x; and determines that a timing at which the PDSCH is transmittable after a predetermined duration starting from the symbol w in slot n–x in which the wake-up signal is transmitted is a timing at which the PDSCH is receivable by the UE; or determines that a timing at which the PDSCH is transmittable after the symbol w in slot n–x in which the wake-up signal is transmitted is a timing at which the PDSCH is receivable by the UE. The predetermined duration is a predetermined number of symbols or a predetermined absolute time value.

A twentieth embodiment of the present disclosure provides a codebook determination apparatus. As shown in FIG.

18, the apparatus includes a first confirmation module 61, a second confirmation module 62 and a third confirmation module 63.

The first confirmation module 61 is configured to confirm that the UE acquires the position and/or the number of working sub-bands for the UE after the UE is awakened; or the UE acquires the position and/or the number of CCs for the UE after the UE is awakened.

The second confirmation module 62 is configured to confirm that the UE determines, in each of the working sub-bands/CCs based on the timing of being awakened, the timing at which the PDSCH data is receivable by the UE.

The third confirmation module 63 is configured to confirm that the UE forms the corresponding HARQ-ACK codebook based on the timing at which the PDSCH data is receivable.

In this embodiment, the first confirmation module 61 is configured to confirm that the UE acquires the position and/or the number of working sub-bands for the UE after the UE is awakened. In an embodiment, the first confirmation module 61 is configured to confirm the following operations: The UE receives a wake-up signal and confirms that the UE is awakened by the wake-up signal, and the UE acquires the position and/or the number of the working sub-bands from the wake-up signal; or is configured to confirm that the UE acquires the position and/or the number of the working sub-bands required by the UE after the UE is awakened from DCI; or is configured to confirm that the UE uses default sub-bands as the working sub-bands according to a rule agreed between the UE and a base station.

The first confirmation module 61 is configured to confirm that the UE acquires the position and/or the number of working CCs for the UE after the UE is awakened. In an embodiment, the first confirmation module 61 is configured to confirm the following operations: A UE receives a wake-up signal and confirms that the UE is awakened by the wake-up signal, and the UE acquires the position and/or the number of CCs from the wake-up signal; or is configured to confirm that the UE activates CCs through a MAC CE and uses the activated CCs as working CCs; or is configured to confirm that the UE acquires, from DCI, the position and/or the number of working CCs required by the UE after the UE is awakened; or is configured to confirm that the UE uses default CCs as working CCs according to a rule agreed between the UE and a base station.

Figure 19:
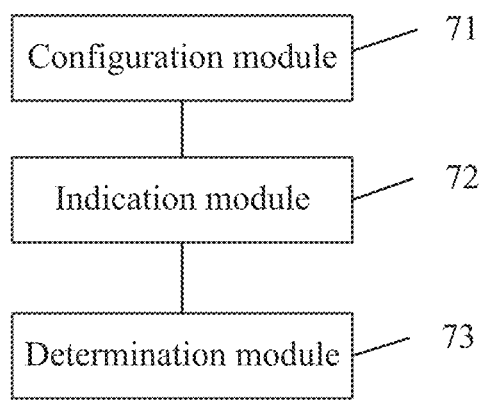
FIG. 19 is a block diagram of a codebook determination apparatus according to a twenty-first embodiment and a twenty-second embodiment of the present disclosure.

A twenty-first embodiment of the present disclosure provides a codebook determination apparatus. As shown in FIG. 19, the apparatus includes a configuration module 71, an indication module 72 and a determination module 73.

The configuration module 71 is configured to configure at least two interval k1 value sets or at least two interval k0 value sets for a UE.

The indication module 72 is configured to instruct the UE to select one k1 or k0 value set from the k1 value sets or the k0 value sets or determine that the UE selects one k1 or k0 value set from the k1 value sets or the k0 value sets according to a rule agreed with the UE. In an embodiment, the indication module 72 is configured to agree on a rule with the UE, where when the traffic type is URLLC, one k1 or k0 value set determined based on the subcarrier spacing is selected.

The determination module 73 is configured to determine that the UE forms an HARQ-ACK codebook based on the selected k1 or k0 value set.

k1 satisfies that in response to the end of a PDSCH received by the UE being in slot n, an HARQ-ACK corresponding to the PDSCH is transmitted in slot n+k1. k0 satisfies that in response to the end of downlink control information (DCI) which is used for scheduling PDSCH and received by the UE being in slot n, the PDSCH corresponding to the DCI is transmitted in slot n+k0.

In this embodiment, a selection module is further included. The selection module is configured to, before the k1 value sets or the k0 value sets are configured for the UE, determine the k1 value sets and the k0 value sets based on a subcarrier spacing. When the subcarrier spacing used is 15 kHz, at least one k1 value set contains an element composed of 0 or contains elements composed of 0 and/or 1, and at least one k0 value set contains an element composed of 0 or contains elements composed of 0 and/or 1. When the subcarrier spacing used is 30 kHz, at least one k1 value set contains elements composed of one or more of 0 and/or 1 or contains elements composed of one or more of 0, 1 and 2, and at least one k0 value set contains elements composed of one or more of 0 and/or 1 or contains elements composed of one or more of 0, 1 and 2. When the subcarrier spacing used is 60 kHz, at least one k1 value set contains elements composed of one or more of 0, 1, 2 and 3 or contains elements composed of one or more of 0, 1, 2, 3 and 4, and at least one k0 value set contains elements composed of one or more of 0, 1, 2 and 3 or contains elements composed of one or more of 0, 1, 2, 3 and 4. When the subcarrier spacing used is 120 kHz, at least one k1 value set contains elements composed of one or more of 0, 1, 2, 3, 4, 5, 6 and 7 or contains elements composed of one or more of 0, 1, 2, 3, 4, 5, 6, 7 and 8, and at least one k0 value set contains elements composed of one or more of 0, 1, 2, 3, 4, 5, 6 and 7 or contains elements composed of one or more of 0, 1, 2, 3, 4, 5, 6, 7 and 8. When the subcarrier spacing used is 240 kHz, at least one k1 value set contains elements composed of one or more of 0, 1, 2, 3, 4, 5, 6, 7, 8, 9, 10, 11, 12, 13, 14 and 15 or contains elements composed of one or more of 0, 1, 2, 3, 4, 5, 6, 7, 8, 9, 10, 11, 12, 13, 14, 15 and 16, and at least one k0 value set contains elements composed of one or more of 0, 1, 2, 3, 4, 5, 6, 7, 8, 9, 10, 11, 12, 13, 14 and 15 or contains elements composed of one or more of 0, 1, 2, 3, 4, 5, 6, 7, 8, 9, 10, 11, 12, 13, 14, 15 and 16.

A twenty-second embodiment of the present disclosure provides a codebook determination apparatus. As shown in FIG. 19, the apparatus includes a configuration module 71, an indication module 72 and a determination module 73.

The configuration module 71 is configured to configure one corresponding k1 value set or k0 value set for one traffic type. One k1 value set or k0 value set configured for URLLC traffic is determined based on a subcarrier spacing.

The indication module 72 is configured to indicate one k1 or k0 value set to the UE; or indicate a traffic type of the UE to enable the UE to select one k1 or k0 value set based on the traffic type. The method of the indication includes indication through a parameter in DCI or through a MAC CE.

When the traffic type is URLLC, one k1 or k0 value set determined based on a subcarrier spacing is selected.

The determination module 73 is configured to determine that the UE forms an HARQ-ACK codebook based on the selected k1 or k0 value set. Selecting one k1 or k0 value set from the k1 value sets or the k0 value sets includes one or more of the following: performing selection based on a DCI format, where when the DCI format corresponds to URLLC, one k1 or k0 value set determined based on the subcarrier spacing is selected; performing selection based on the type of traffic scheduled through DCI, where when the traffic scheduled through the DCI is URLLC, one k1 or k0 value set determined based on the subcarrier spacing is selected; performing selection based on the type of an RNTI used by DCI, where when the RNTI used by the DCI is the RNRI of URLLC traffic, one k1 or k0 value set determined based on the subcarrier spacing is selected; and performing selection based on a working BWP of the UE, where when the working BWP of the UE is a bandwidth of URLLC traffic, one k1 or k0 value set determined based on the subcarrier spacing is selected.

In this embodiment, the configuration module is used to configure one k1 value set or k0 value set based on a traffic type, and then the determination module is used to form an HARQ-ACK codebook based on the selected k1 or k0 value set. In this manner, the problem of relatively large codebook overheads is solved.

Figure 20:
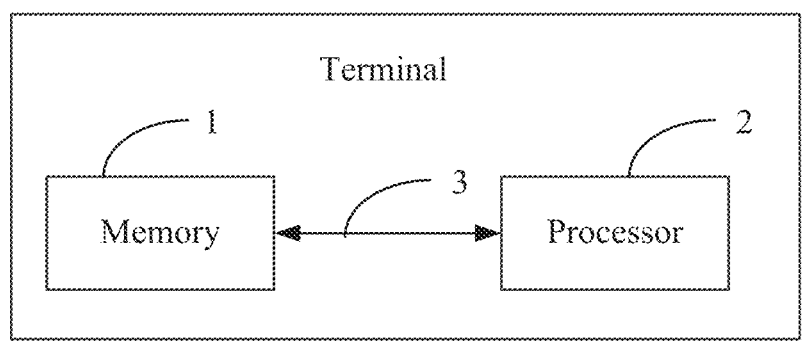
FIG. 20 is a block diagram of a codebook determination apparatus according to a twenty-third embodiment of the present disclosure.

A twenty-third embodiment of the present disclosure provides a terminal. As shown in FIG. 20, the terminal includes a memory 1, a processor 2 and a communication bus 3. The communication bus 3 is configured for connection and communication between the processor 2 and the memory 1.

In this embodiment of the present disclosure, the processor 2 may be a general-purpose processor such as a central processing unit (CPU), a digital signal processor (DSP), an application-specific integrated circuit (ASIC), or one or more integrated circuits configured to implement embodiments of the present disclosure. The memory 1 is configured to store instructions executable by the processor 2.

The memory 1 is configured to store program codes and transmit the program codes to the processor 2. The memory 1 may include a volatile memory such as a random-access memory (RAM), may include a non-volatile memory such as a read-only memory (ROM), a flash memory, a hard disk drive (HDD) or a solid-state drive (SSD), and may also include a combination of the preceding types of memories.

In this embodiment of the present disclosure, the processor 2 is configured to execute a codebook determination program stored in the memory, and when executing the computer program, the processor performs the following method steps: determining, based on a timing of being awakened, a timing at which PDSCH data is receivable by the UE; and forming a corresponding HARQ-ACK codebook based on the timing at which the PDSCH data is receivable.

Alternatively, when executing the computer program, the processor 2 performs the following method steps: receiving signaling, where at least two interval k1 value sets or at least two interval k0 value sets are configured in the signaling; and receiving an indication of a base station and selecting one k1 or k0 value set from the k1 value sets or the k0 value sets according to the indication, or selecting one k1 or k0 value set from the k1 value sets or the k0 value sets according to a rule agreed between the UE and the base station.

For details about the implementation process of the preceding method steps, reference may be made to the first embodiment to the fourth embodiment or reference may be made to the fifth embodiment to the seventh embodiment. The details are not repeated here in this embodiment.

Figure 21:
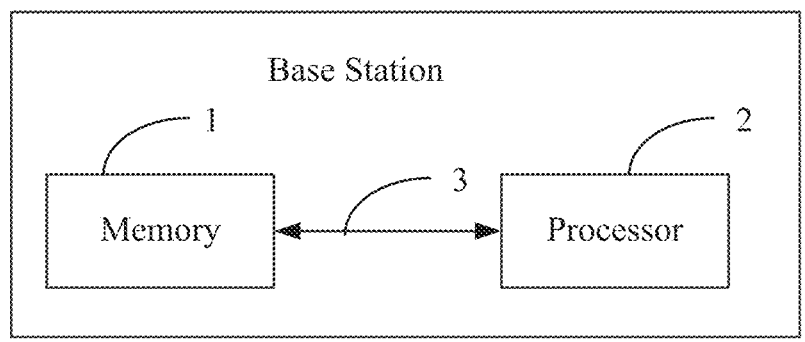
FIG. 21 is a block diagram of a base station according to a twenty-fourth embodiment of the present disclosure.

A twenty-fourth embodiment of the present disclosure provides a base station. As shown in FIG. 21, the base station includes a memory 1, a processor 2 and a communication bus 3. The communication bus 3 is configured for connection and communication between the processor 2 and the memory 1.

In this embodiment of the present disclosure, the processor 2 may be a general-purpose processor such as a CPU, a DSP, an ASIC, or one or more integrated circuits configured to implement embodiments of the present disclosure. The memory 1 is configured to store instructions executable by the processor 2.

The memory 1 is configured to store program codes and transmit the program codes to the processor 2. The memory 1 may include a volatile memory such as a RAM, may include a non-volatile memory such as a ROM, a flash memory, an HDD or an SSD, and may also include a combination of the preceding types of memories.

In this embodiment of the present disclosure, the processor 2 is configured to execute a codebook determination program stored in the memory, and when executing the computer program, the processor performs the following method steps: The base station confirms that a UE determines, based on a timing of being awakened, a timing at which PDSCH data is receivable by the UE; and the base station confirms that the UE forms the corresponding HARQ-ACK codebook based on the timing at which the PDSCH data is receivable.

Alternatively, when executing the computer program, the processor 2 performs the following method steps: The base station configures at least two interval k1 value sets or at least two interval k0 value sets for a UE; the base station instructs the UE to select one k1 or k0 value set from the k1 value sets or the k0 value sets, or the base station determines that the UE selects one k1 or k0 value set from the k1 value sets or the k0 value sets according to a rule agreed between the UE and the base station; and the base station determines that the UE forms an HARQ-ACK codebook based on the selected k1 or k0 value set. k1 satisfies that in response to the end of a PDSCH received by the UE being in slot n, an HARQ-ACK corresponding to the PDSCH is transmitted in slot n+k1. k0 satisfies that in response to the end of downlink control information (DCI) which is used for scheduling PDSCH and received by the UE being in slot n, the PDSCH corresponding to the DCI is transmitted in slot n+k0.

For details about the implementation process of the preceding method steps, reference may be made to the eighth embodiment to the tenth embodiment or reference may be made to the eleventh embodiment to the thirteenth embodiment. The details are not repeated here in this embodiment.

A twenty-fifth embodiment of the present disclosure provides a storage medium. The storage medium stores a computer program. When executing the computer program, a processor performs steps of the following codebook determination method: determining, based on a timing of being awakened, a timing at which PDSCH data is receivable by the UE; and forming a corresponding HARQ-ACK codebook based on the timing at which the PDSCH data is receivable.

Alternatively, when executing the computer program, a processor performs the following method steps: receiving signaling, where at least two interval k1 value sets or at least two interval k0 value sets are configured in the signaling; and receiving an indication of a base station and selecting one k1 or k0 value set from the k1 value sets or the k0 value sets according to the indication, or selecting one k1 or k0 value set from the k1 value sets or the k0 value sets according to a rule agreed between a UE and the base station.

Alternatively, when executing the computer program, a processor performs the following method steps: A base station confirms that a UE determines, based on a timing of being awakened, a timing at which PDSCH data is receivable by the UE; and the base station confirms that the UE forms a corresponding HARQ-ACK codebook based on the timing at which the PDSCH data is receivable.

Alternatively, when executing the computer program, a processor performs the following method steps: A base station configures at least two interval k1 value sets or at least two interval k0 value sets for a UE; the base station instructs a UE to select one k1 or k0 value set from the k1 value sets or the k0 value sets, or the base station determines that the UE selects one k1 or k0 value set from the k1 value sets or the k0 value sets according to a rule agreed between the UE and the base station; and the base station determines that the UE forms an HARQ-ACK codebook based on the selected k1 or k0 value set. k1 satisfies that in response to the end of a PDSCH received by the UE being in slot n, an HARQ-ACK corresponding to the PDSCH is transmitted in slot n+k1. k0 satisfies that in response to the end of downlink control information (DCI) which is used for scheduling PDSCH and received by the UE being in slot n, the PDSCH corresponding to the DCI is transmitted in slot n+k0.

For details about the implementation process of the preceding method steps, reference may be made to the first embodiment to the fourth embodiment or reference may be made to the fifth embodiment to the seventh embodiment; or reference may be made to the eighth embodiment to the tenth embodiment or reference may be made to the eleventh embodiment to the thirteenth embodiment. The details are not repeated here in this embodiment.

It is to be noted that as used herein, the term "include", "contain" or any other variant thereof is intended to encompass a non-exclusive inclusion so that a process, method, article or apparatus that includes a series of elements not only includes these elements but also includes other elements that are not expressly listed or are inherent to such a process, method, article or apparatus. In the absence of more restrictions, the elements defined by the statement "including a . . . " do not exclude the presence of additional identical elements in the process, method, article or apparatus that includes the elements.

The serial numbers of the preceding embodiments of the present disclosure are for purposes of illustration only and do not indicate superiority and inferiority of the embodiments.

From the description of the preceding embodiments, it is apparent to those skilled in the art that the method in the preceding embodiments may be implemented by software plus a necessary general-purpose hardware platform or may of course be implemented by hardware. However, in many cases, the former is a preferred implementation. Based on this understanding, the solution provided in the present disclosure substantially, or the part contributing to the existing art, may be embodied in the form of a software product. The software product is stored in a storage medium (such as a ROM/RAM, a magnetic disk or an optical disk) and includes several instructions for enabling a terminal (which may be a mobile phone, a computer, a base station, an air conditioner or a network device) to perform the method according to each embodiment of the present disclosure.

Embodiments of the present disclosure are described above in conjunction with the drawings, but the present disclosure is not limited to the preceding implementations. The preceding implementations are merely illustrative and not limiting. In light of the present disclosure, without departing from the spirit of the present disclosure and the scope of the claims, those having ordinary skill in the art can make many forms, all of which fall within the scope of the present disclosure.

What is claimed is:

1. A codebook determination method, comprising:
receiving, by a user equipment (UE), signaling, wherein the signaling is used for configuring one or more k1 value sets for different service types;
receiving, by the UE, an indication from a base station and determining, by the UE, at least one k1 value set from the one or more k1 value sets according to the indication; or determining, by the UE, at least one k1 value set from the one or more k1 value sets according to a rule agreed between the UE and the base station; and
generating, by the UE, a Hybrid Automatic Repeat reQuest-Acknowledgement (HARQ-ACK) codebook based on the determined the at least one k1 value set,
sending, by the UE, the HARQ-ACK codebook;
wherein the k1 satisfies that in response to an end of a physical downlink shared channel (PDSCH) received by the UE being in slot n, an HARQ-ACK corresponding to the PDSCH is transmitted in slot n+k1;
wherein the determining, by the UE, at least one k1 value set from the one or more k1 value sets according to a rule agreed between the UE and the base station comprises:
in response to a service type, the service type being scheduled by a downlink control information (DCI) format associated with the service type, and the DCI format being used by a Radio Network Temporary Identity, RNTI, associated with the service type, determining, by the UE, the at least one k1 value set from the one or more k1 value sets.

2. A terminal, comprising a memory, a processor, and a computer program stored in the memory and executable by the processor, wherein the processor, when executing the computer program, performs steps of the codebook determination method of claim 1.

3. A non-transitory storage medium, the non-transitory storage medium storing a computer program, wherein a processor, when executing the computer program, performs steps of the codebook determination method of claim 1.

4. The codebook determination method of claim 1, wherein the one or more k1 value sets comprise at least two of k1 value sets, and the one or more k0 value sets comprise at least two of k0 value sets.

5. The codebook determination method of claim 1, wherein the signaling further is used for configuring one or more k0 value sets for different service types, and the method further comprises:
receiving, by the UE, an indication from the base station and determining, by the UE, at least one k0 value set from the one or more k0 value sets according to the indication; or, determining, by the UE, at least one k0 value set from the one or more k0 value sets according to a rule agreed between the UE and the base station; and
generating, by the UE, a Hybrid Automatic Repeat reQuest-Acknowledgement (HARQ-ACK) codebook based on the determined the at least one k0 value set;
wherein the k0 satisfies that in response to an end of DCI which is used for scheduling PDSCH and received by the UE being in slot n, the PDSCH corresponding to the DCI is transmitted in slot n+k0.

6. The codebook determination method of claim 5, further comprising:
determining the at least one k1 value sets or the at least one k0 value sets based on a subcarrier spacing, wherein in response to the subcarrier spacing used being 15 kHz, the at least one k1 value set of the one or more k1 value sets contains elements composed of at least one of 0 and/or 1, or the at least one k0 value set of the one or more k0 value sets contains elements composed of at least one of 0 and/or 1;

in response to the subcarrier spacing used being 30 kHz, the at least one k1 value set of the one or more k1 value sets contains elements composed of at least one of 0, 1 and 2, or at least one k0 value set of the one or more k0 value sets contains elements composed of at least one of 0, 1 and 2;

in response to the subcarrier spacing used being 60 kHz, the at least one k1 value set of the one or more k1 value sets contains elements composed of at least one of 0, 1, 2, 3 and 4, or the at least one k0 value set of the one or more k0 value sets contains elements composed of at least one of 0, 1, 2, 3 and 4;

in response to the subcarrier spacing used being 120 kHz, the at least one k1 value set of the one or more k1 value sets contains elements composed of at least one of 0, 1, 2, 3, 4, 5, 6, 7 and 8, or the at least one k0 value set of the one or more k0 value sets contains elements composed of at least one of 0, 1, 2, 3, 4, 5, 6, 7 and 8; or in response to the subcarrier spacing used being 240 kHz, the at least one k1 value set of the one or more k1 value sets contains elements composed of at least one of 0, 1, 2, 3, 4, 5, 6, 7, 8, 9, 10, 11, 12, 13, 14, 15 and 16, or the at least one k0 value set of the one or more k0 value sets contains elements composed of at least one of 0, 1, 2, 3, 4, 5, 6, 7, 8, 9, 10, 11, 12, 13, 14, 15 and 16.

7. The codebook determination method of claim 5, wherein the at least one k1 value set or the at least one k0 value set is determined in the following manner: the base station configures one corresponding k1 value set or k0 value set for one service type, wherein the one or more k1 value sets or the one or more k0 value set configured for ultra-reliable low-latency communication (URLLC) service is determined based on a subcarrier spacing.

8. The codebook determination method of claim 5, wherein determining, by the UE, the at least one k1 from the one or more k1 value sets or the at least k0 value set from the one or more k0 value sets according to the indication comprises:
receiving, by the UE, the at least one k1 value set or the at least k0 value set indicated by the base station; or receiving, by the UE, an indicated service type and determining the at least one k1 value set or the at least one k0 value set based on the service type,
wherein a method of the indication comprises indication through a parameter in DCI or through a medium access control (MAC) control element (CE), and
wherein in response to the service type being URLLC, the at least k1 value set or the at least k0 value set determined based on a subcarrier spacing is determined.

9. The codebook determination method of claim 5, wherein determining, by the UE, the at least one k1 value set from the one or more k1 value sets or the at least one k0 value set from the at least one k0 value sets according to the rule agreed between the UE and the base station comprises:
in response to a first DCI format being used for scheduling data for the UE, using, by the UE, a first k1 value set or a first k0 value set configured for the UE;
in response to a second DCI format being used for scheduling data for the UE, using, by the UE, a second k1 value set or a second k0 value set configured for the UE; or
in response to a first DCI format and a second DCI format being used for scheduling data for the UE, using, by the UE, a union of a first k1 value set and a second k1 value set configured for the UE, or using, by the UE, a union of a first k0 value set and a second k0 value set configured for the UE.

10. A codebook determination method, comprising:
configuring, by a base station, one or more k1 value sets for different service types for a user equipment (UE);
receiving, by the base station, a Hybrid Automatic Repeat reQuest-Acknowledgement (HARQ-ACK) codebook generated based on at least one k1 value set determined from the one or more k1 value sets,
wherein the at least one k1 value set are determined in one of the following manners:
determining at least one k1 value set from the one or more k1 value sets based on an indication from the base station; or determining at least one k1 value sets from the one or more k1 value sets according to a rule agreed between the UE and the base station; and
wherein the k1 satisfies that in response to an end of a physical downlink shared channel (PDSCH) transmitted by the UE being in slot n, an HARQ-ACK corresponding to the PDSCH is received in slot n+k1; and
wherein the rule agreed between the UE and the base station comprises:
in response to a service type, the service type being scheduled by a downlink control information (DCI) format associated with the service type, and the DCI format being used by a Radio Network Temporary Identity, RNTI, associated with the service type, the at least one k1 value set is determined from the one or more k1 value sets.

11. A base station, comprising a memory, a processor, and a computer program stored in the memory and executable by the processor, wherein the processor, when executing the computer program, performs steps of the codebook determination method of claim 10.

12. The codebook determination method of claim 10, wherein the one or more k1 value sets comprise at least two of k1 value sets, and the one or more k0 value sets comprise at least two of k0 value sets.

13. The codebook determination method of claim 10, further comprising:
configuring, by a base station, one or more k0 value sets for different service types for the UE;
receiving, by the base station, a HARQ-ACK codebook generated based on at least one k0 value set determined from the one or more k0 value sets,
wherein the at least one k0 value set are determined in one of the following manners:
determining at least one k0 value set from the one or more k0 value sets based on an indication from the base station or k0 value set from the k0 value sets; or determining at least one k0 value sets from the one or more k0 value sets according to a rule agreed between the UE and the base station;
wherein the k0 satisfies that in response to an end of DCI which is used for scheduling PDSCH and received by the UE being in slot n, the PDSCH corresponding to the DCI is transmitted in slot n+k0.

14. The codebook determination method of claim 13, further comprising:
- wherein the at least one k0 value set or the at least one k1 value set is determined in the following manners:
- determining the at least one k1 value sets or the at least one k0 value sets based on a subcarrier spacing, wherein
- in response to the subcarrier spacing used being 15 kHz, the at least one k1 value set contains elements composed of at least one of 0 or 1, or the at least one k0 value set contains elements composed of at least one of 0 or 1;
- in response to the subcarrier spacing used being 30 kHz, the at least one k1 value set contains elements composed of at least one of 0, 1 and 2, or the at least one k0 value set contains elements composed of at least one of 0, 1 and 2;
- in response to the subcarrier spacing used being 60 kHz, the at least one k1 value set contains elements composed of at least one of 0, 1, 2, 3 and 4, or the at least one k0 value set contains elements composed of at least one of 0, 1, 2, 3 and 4;
- in response to the subcarrier spacing used being 120 kHz, the at least one k1 value set contains elements composed of at least one of 0, 1, 2, 3, 4, 5, 6, 7 and 8, or the at least one k0 value set contains elements composed of at least one of 0, 1, 2, 3, 4, 5, 6, 7 and 8; or
- in response to the subcarrier spacing used being 240 kHz, the at least one k1 value set contains elements composed of at least one of 0, 1, 2, 3, 4, 5, 6, 7, 8, 9, 10, 11, 12, 13, 14, 15 and 16, or the at least one k0 value set contains elements composed of at least one of 0, 1, 2, 3, 4, 5, 6, 7, 8, 9, 10, 11, 12, 13, 14, 15 and 16.

15. The codebook determination method of claim 13,
- wherein configuring, by the base station, the one or more k1 value sets or the one or more k0 value sets for the UE comprises configuring, by the base station, one corresponding k1 value set or k0 value set for one service type, wherein the one or more k1 value set or the one or more k0 value set configured for ultra-reliable low-latency communication (URLLC) service is determined based on a subcarrier spacing.

16. The codebook determination method of claim 13,
- wherein the determining the at least one k1 from the one or more k1 value sets or the at least k0 value set from the one or more k0 value sets comprises:
- indicating the at least one k1 or the at least k0 value set to the UE; or indicating a service type of the UE to enable the UE to determine the at least one k1 or the at least k0 value set based on the service type,
- wherein a method of the indication comprises indication through a parameter in DCI or through a medium access control (MAC) control element (CE), and
- wherein in response to the service type being URLLC, the at least one k1 or the at least one k0 value set determined based on a subcarrier spacing is determined.

17. The codebook determination method of claim 13,
- wherein determining the at least one k1 from the one or more k1 value sets or the at least one k0 value set from the one or more k0 value sets according to the rule agreed between the UE and the base station comprises agreeing on the rule between the UE and the base station, wherein
- in response to a first DCI format being used for scheduling data for the UE, a first k1 value set or a first k0 value set configured for the UE is used;
- in response to a second DCI format being used for scheduling data for the UE, a second k1 value set or a second k0 value set configured for the UE is used; or
- in response to a first DCI format and a second DCI format being used for scheduling data for the UE, a union of a first k1 value set and a second k1 value set configured for the UE is used, or a union of a first k0 value set and a second k0 value set configured for the UE is used.

* * * * *

UNITED STATES PATENT AND TRADEMARK OFFICE
CERTIFICATE OF CORRECTION

PATENT NO. : 12,107,685 B2
APPLICATION NO. : 17/277281
DATED : October 1, 2024
INVENTOR(S) : Wei Gou et al.

Page 1 of 1

It is certified that error appears in the above-identified patent and that said Letters Patent is hereby corrected as shown below:

In the Claims

At Column 30, Claim 10, Line 28, please replace "by the UE being in slot n" with --by the base station being in slot n--.

Signed and Sealed this
Sixth Day of May, 2025

Coke Morgan Stewart
*Acting Director of the United States Patent and Trademark Office*